(12) United States Patent
Mullen

(10) Patent No.: US 10,974,151 B2
(45) Date of Patent: Apr. 13, 2021

(54) SYSTEMS AND METHODS FOR LOCATION BASED GAMES AND EMPLOYMENT OF THE SAME ON LOCATION ENABLED DEVICES

(76) Inventor: Jeffrey D Mullen, New York, NY (US)

(*) Notice: Subject to any disclaimer, the term of this patent is extended or adjusted under 35 U.S.C. 154(b) by 0 days.

(21) Appl. No.: 11/461,761

(22) Filed: Aug. 1, 2006

(65) Prior Publication Data

US 2006/0287026 A1   Dec. 21, 2006

Related U.S. Application Data

(63) Continuation of application No. 10/932,536, filed on Sep. 1, 2004.

(Continued)

(51) Int. Cl.
| | |
|---|---|
| *G09G 5/00* | (2006.01) |
| *A63F 9/24* | (2006.01) |
| *A63F 13/00* | (2014.01) |
| *G06F 17/00* | (2006.01) |
| *G06F 19/00* | (2011.01) |
| *A63F 13/65* | (2014.01) |
| *A63F 13/216* | (2014.01) |
| *A63F 13/79* | (2014.01) |

(Continued)

(52) U.S. Cl.
CPC ............ *A63F 13/65* (2014.09); *A63F 13/216* (2014.09); *A63F 13/332* (2014.09); *A63F 13/42* (2014.09); *A63F 13/79* (2014.09); *A63F 2300/204* (2013.01); *A63F 2300/205* (2013.01); *A63F 2300/406* (2013.01); *A63F 2300/408* (2013.01); *A63F 2300/5573* (2013.01); *A63F 2300/8082* (2013.01)

(58) Field of Classification Search
CPC .............................................. A63F 2300/5573
USPC .................................................. 463/1, 7, 40
See application file for complete search history.

(56) References Cited

U.S. PATENT DOCUMENTS

| | | |
|---|---|---|
| 5,139,261 A | 8/1992 | Openiano |
| 5,523,890 A | 6/1996 | Reaney |

(Continued)

FOREIGN PATENT DOCUMENTS

WO    WO02073287 A2    9/1992

OTHER PUBLICATIONS

Wikipedia, N-Gage (device), Oct. 7, 2003, https://en.wikipedia.org/wiki/N-Gage_(device).*

(Continued)

*Primary Examiner* — Kevin Y Kim

(57) ABSTRACT

A location-based game system is provided. Such a system may take the form of any device (e.g., a wireless telephone) that includes a locating device (e.g., a GPS system).

One such location-based game may operate such that the actual, physical location of a user on a physical playfield corresponds to the location of a virtual character on a virtual playfield. Such location based games are referred to herein as actuality games.

In one multiplayer actuality embodiment, two game devices may communicate location, and other, information to a remote database such that the two user's may interact on different physical playfields, but play on the same virtual playfield.

A number of wireless communications protocols, self-configuration, and auto-download software applications are also provided to optimize integration with, for example, a wireless telephone.

16 Claims, 14 Drawing Sheets

Related U.S. Application Data

(60) Provisional application No. 60/499,810, filed on Sep. 2, 2003, provisional application No. 60/603,481, filed on Aug. 20, 2004.

(51) Int. Cl.
*A63F 13/332* (2014.01)
*A63F 13/42* (2014.01)

(56) References Cited

U.S. PATENT DOCUMENTS

| | | | |
|---|---|---|---|
| 5,724,660 A | 3/1998 | Kauser et al. | |
| 5,741,182 A | 4/1998 | Lipps et al. | |
| 5,802,274 A | 9/1998 | Dorak et al. | |
| 5,902,343 A | 5/1999 | Hale et al. | |
| 5,913,727 A | 6/1999 | Ahdoot | |
| 5,991,085 A | 11/1999 | Rallison | |
| 5,999,808 A | 12/1999 | LaDue | |
| 6,011,653 A | 1/2000 | Karasawa | |
| 6,015,344 A | 1/2000 | Kelly et al. | |
| 6,028,593 A | 2/2000 | Rosenberg et al. | |
| 6,080,063 A | 6/2000 | Khosla | |
| 6,106,397 A | 8/2000 | Phillips | |
| 6,106,399 A | 8/2000 | Baker et al. | |
| 6,124,825 A | 9/2000 | Eschenbach | |
| 6,184,847 B1 | 2/2001 | Fateh | |
| 6,287,200 B1* | 9/2001 | Sharma | 463/40 |
| 6,337,688 B1 | 1/2002 | Berstis | |
| 6,378,390 B2 | 4/2002 | Saito | |
| 6,520,853 B2* | 2/2003 | Suzuki | 463/7 |
| 6,522,312 B2 | 2/2003 | Ohshima et al. | |
| 6,527,641 B1 | 3/2003 | Sinclair et al. | |
| 6,545,661 B1 | 4/2003 | Goschy et al. | |
| 6,561,809 B1 | 5/2003 | Lynch | |
| 6,612,925 B1 | 9/2003 | Forsberg | |
| 6,625,299 B1 | 9/2003 | Meisner et al. | |
| 6,633,267 B2 | 10/2003 | Numa | |
| 6,633,304 B2 | 10/2003 | Anabuki | |
| 6,641,482 B2* | 11/2003 | Masuyama | A63F 13/422 463/43 |
| 6,663,105 B1 | 12/2003 | Sullivan et al. | |
| 6,690,947 B1 | 2/2004 | Tom | |
| 6,716,103 B1 | 4/2004 | Eck | |
| 6,735,435 B2 | 5/2004 | Newell et al. | |
| 6,850,844 B1* | 2/2005 | Walters et al. | 701/410 |
| 6,853,935 B2 | 2/2005 | Satch et al. | |
| 6,872,139 B2 | 3/2005 | Sato et al. | |
| 6,951,515 B2 | 10/2005 | Ohshima et al. | |
| 6,961,055 B2* | 11/2005 | Doak et al. | 345/419 |
| 6,972,734 B1 | 12/2005 | Ohshima et al. | |
| 7,038,699 B2 | 5/2006 | Sato et al. | |
| 7,050,078 B2 | 5/2006 | Dempski | |
| 7,056,216 B2 | 8/2006 | Ohshima et al. | |
| 7,084,887 B1 | 8/2006 | Sato et al. | |
| 7,303,474 B2 | 12/2007 | Anderson et al. | |
| 7,657,910 B1 | 2/2010 | McAulay et al. | |
| 2001/0006908 A1 | 7/2001 | Fujioka et al. | |
| 2001/0010541 A1 | 8/2001 | Fernandez | |
| 2001/0040591 A1 | 11/2001 | Abbott et al. | |
| 2001/0054019 A1 | 12/2001 | de Fabrega | |
| 2002/0052933 A1 | 5/2002 | Leonhard et al. | |
| 2002/0061741 A1 | 5/2002 | Leung et al. | |
| 2002/0063655 A1 | 5/2002 | Aoyama | |
| 2002/0072418 A1 | 6/2002 | Masuyama | |
| 2002/0082068 A1 | 6/2002 | Singhai | |
| 2002/0082082 A1* | 6/2002 | Stamper et al. | 463/32 |
| 2002/0086732 A1 | 7/2002 | Kirmse et al. | |
| 2002/0090985 A1* | 7/2002 | Tochner et al. | 463/1 |
| 2002/0102992 A1 | 8/2002 | Koorapaty | |
| 2002/0128063 A1 | 9/2002 | Kunieda et al. | |
| 2002/0131404 A1 | 9/2002 | Mehta et al. | |
| 2002/0190861 A1 | 12/2002 | Wentworth | |
| 2002/0193080 A1 | 12/2002 | Komsi | |
| 2003/0032484 A1 | 2/2003 | Ohshima | |
| 2003/0062675 A1 | 4/2003 | Noro et al. | |
| 2003/0134665 A1 | 7/2003 | Kato et al. | |
| 2003/0144047 A1 | 7/2003 | Sprogis | |
| 2003/0171147 A1 | 9/2003 | Sinclair et al. | |
| 2003/0210228 A1 | 11/2003 | Ebersole et al. | |
| 2003/0217070 A1 | 11/2003 | Gotoh | |
| 2003/0224855 A1* | 12/2003 | Cunningham | 463/41 |
| 2004/0041822 A1 | 3/2004 | Lizuka | |
| 2004/0046655 A1* | 3/2004 | Benes et al. | 340/539.1 |
| 2004/0053690 A1 | 3/2004 | Fogel et al. | |
| 2004/0058732 A1 | 3/2004 | Plocionelli | |
| 2004/0128250 A1 | 7/2004 | Fox | |
| 2004/0164897 A1 | 8/2004 | Treadwell et al. | |
| 2004/0224740 A1 | 11/2004 | Ball et al. | |
| 2004/0248653 A1 | 12/2004 | Barros et al. | |
| 2005/0009608 A1 | 1/2005 | Roberts et al. | |
| 2005/0048987 A1 | 3/2005 | Glass | |
| 2006/0154710 A1* | 7/2006 | Serafat | 463/1 |
| 2008/0253315 A1 | 10/2008 | Bodlaender | |

OTHER PUBLICATIONS

IGN, Call of Duty, Sep. 27, 2004, http://www.ign.com/articles/2004/09/28/call-of-duty-6.*

Nokia, "Let the sales begin! Nokia N-GageTM game deck sales to start," Oct. 6, 2003, https://web.archive.org/web/20081210124611/http://www.nokia.com/A4136002?newsid=919619.*

Antti Kotanen, Marko Hannikainen, Helena Leppakoski, Timo D. Hamalainen "Experimnets with Bluetooth" Proeedings of the International Conferene on Information Technology: Computers and Communications (ITCC '03) Apr. 2003.

"First Person Indoor/outdoor Augmented Reality Application: ARQuake", written by Thomas et al, and published Feb. 2002.

Mortal Kombat instruction booklet for Super Nintendo, 1992, Licensed from Midway.

Mortak Kombat 4 (released Oct. 15, 1997). Published by Midway Games <http://en.wikipedia.org/w/index.php?title=Mortal_Kombat_4&printable=yes>.

Youtube.com Screenshot of Super Dodge Ball Walkthrough with Commentary (Part 1 of 2). Accessed: Dec. 14, 2010. http://www.youtube.com/watch?E1LUWmr64JA.

GameFAQs: Super Dodge Ball (NES) FAG/Walkthrough by TOKADasrik. Accessed: Dec. 14, 2010. http://www.gamefaqs.com/nes/587662-super-dodge-ball/faqs/34823.

Halo: Combat Evolved, Wikipedia description, http://en.wikipedia.org/wiki/Halo_%28game%29.

Quake Game Manual, Release cira 1996.

"Description of Journey Geolocation Game" published Nov. 4, 2004 accessible via URLhttps://web.archive.org/web/20041102005616/http://journey.mop/us.com/, 1 page.

Information Filtering for Mobile Augmneted Reality, Simon Julier et al., pp. 3-11, IEEE 0-7695-0846-4/00, 2000.

A Wearable Augmented Reality Testbed for Navigation and Control, Built Solely with Commercial-Off-The-Shelf (COTS) Hardware, Reinhold Behringer et al., pp. 12-19, IEEE 0-7695-0846-4/00, 2000.

Bridging Multiple User Interface Dimensions with Augmented Reality, Deiter Schmalstieg et al., pp. 20 to 29, IEEE 0-7695-0846-4/00, 2000.

The Augmented Man, Didier Stricker et al, pp. 30-36, IEEE 0-7695-0846-4/00, 2000.

Distributed User Tracking Concepts for Augmented Reality Applications, Gudrun Klinker, pp. 20 to 29, pp. 37-44, IEEE 0-7695-0846-4/00, 2000.

Augmneted Workspace: Designing an AR testbed, pp. 47-53, Frank Sauer et al., IEEE 0-7695-0846-4/00, 2000.

Development of te Varioscope AR; A See-Through HMD for Computer-Aided Strategy, Wolfgang Birkfellner, pp. 54-59, IEEE 0-7695-0846-4/00, 2000.

An Optical See-through Display for Mutual Occulsion of Real and Virtual Environments, Kiyoshi Kiyokawa et al., pp. 60-67, IEEE 0-7695-0846-4/00, 2000.

Development of a Stereo Video See-through HDM for AR Systems, Akinari Takagi et al., pp. 68-77, IEEE 0-7695-0846-4/00, 2000.

A mobile Passive Augmented Reality Device—mPARD, H. T. Regenbrecht et al, pp. 81 to 84, IEEE 0-7695-0846-4/00, 2000.

(56) References Cited

OTHER PUBLICATIONS

Adapting to Dynamic Registration Errors Using Level of Error (LOE) Filtering, Blair MacIntyre et al., pp. 85 to 88, IEEE 0-7695-0846-4/00, 2000.
Matching Buildings: Pose estimation in an urban environment, Volker Coors et al., pp. 89 to 92, IEEE 0-7695-0846-4/00, 2000.
Augmenting Buildings with Infrared Information, Andreas Butz et al., pp. 93-96, IEEE 0-7695-0846-4/00, 2000.
A Stereo Vision-based Augmented reality System with an Inertial Sensor, Masayuki Kanbara et al., pp. 97-100, IEEE 0-7695-0846-4/00, 2000.
Virtual Property Lines Drawing on the Monitor for Observation of Unmanned Dam Construction Sides, Nobuyuki et al., pp. 101 to 104, IEEE 0-7695-0846-4/00, 2000.
View-Independent Scene Acquisition for Tele-Presence, Jane Mulligan, pp. 105-108, IEEE 0-7695-0846-4/00, 2000.
Virtual Object Manipulation on a Table-Top AR Environment, H. Kato et al., pp. 111-119, IEEE 0-7695-0846-4/00, 2000.
Markerless Tracking using Planar Structures in the Scene, Gilles Simon et al., pp. 120-128, IEEE 0-7695-0846-4/00, 2000.
Weakly Calibrated Video-based Augmented Reality: Embedding and Rendering through Virtual Camera, pp. 129-136, IEEE 0-7695-0846-4/00, 2000.
Handling Occlusion in Augmented Reality Systems: A Smi-Automated Method, Vincent Lepetit, pp. 137-146, IEEE 0-7695-0846-4/00, 2000.
Single point active alignment method (SPAAM) for optical see-through HMD calibration for HR, Mibran Thenryan et al., pp. 149-158, IEEE 0-7695-0846-4/00, 2000.
Autocalibration of an Electronic Compass in an Outdoor Augmented Reality System, Bruce Hoff et al., pp. 159-164, IEEE 0-7695-0846-4/00, 2000.
Optical See-Through HMD Calibration: A Stereo Method Validated with a Video See-Through System, Yakup Gene et al., pp. 165-174, IEEE 0-7695-0846-4/00, 2000.
Microscope Assisted Guided Interventions (MAGI)—An Application of Augmented reality in Image Guided Surgery, David Hawkes et al., p. 3, IEEE 0-7695-1375-1/01, 2001.
Dynamic Superimposition of Synthetic Objects on Rigid and Simple-deformable Real Objects, Yann Argotti, pp. 5-10, IEEE 0-7695-1375-1/01, 2001.
Real Time Tomograpic Reflection: Phantoms for Calibration and Biopsy, George Steffen et al., pp. 11-19, IEEE 0-7695-1375-1/01, 2001.
Current status of the Varioscope AR, a head-mounted operating microscope for computer-aided surgery, M Figl et al., pp. 20-29, IEEE 0-7695-1375-1/01, 2001.
Augmented Reality Visualization of Ultrasound Images: System Description, Calibration, and Features, Frank Sauer et al., pp. 30-39, IEEE 0-7695-1375-1/01, 2001.
AR Out of the Box, Ulrich Neumann, p. 40, IEEE 0-7695-1375-1/01, 2001.
Design of a Component-Based Augmented Reality Framework, Martin Bauer et al., pp. 45-54, IEEE 0-7695-1375-1/01, 2001.
Finger tracking for interaction in augmented environmnets, Klaus Dorfmuller-Ulhaas, pp. 55-64, IEEE 0-7695-1375-1/01, 2001.
A Hybrid Registration Method for Outdoor Augmented Reality, Kiyohide Satoh et al., pp. 67-76, IEEE 0-7695-1375-1/01, 2001.
Augmented Realtiy in Wide Area Sentient Environment, Joseph Newman et al., pp. 77-86, IEEE 0-7695-1375-1/01, 2001.
Markerless Augmented Reality with a Real-time Affine Region Tracker, V. Ferrari, pp. 87-96, IEEE 0-7695-1375-1/01, 2001.
Extendible Tracking by Line Auto-Calibration, Bolan Jiang et al., pp. 97-103, IEEE 0-7695-1375-1/01, 2001.
Inertial proprioceptive devices: self-motion-sensing toys and tools—MIT Media Lab, Christopher Verplsetse, http://www.finarticles.com/p/articles/mi_m0ISI/is_n-3-4_v35/ni_18891269/print, Sep. 5, 2004.
The Role of Internal Models in Motion Planning and Control: Evidence from Grip Force Adjustments during Movements of Hnad-Held Loads, J. Randall Flanagan et al., The Journal of Neurosciences, Feb. 15, 1997, 17(4):1519-1528.
Presettable Micromachined MEMS Accelerometers, Scott Valoff et al., University of California.
MEMS Sensors in Virtual Reality, Harvey Weinberg et. al., Aug. 2002.
Inertial Navigation—Forty Years of Evolution, A. D. King et. al, GEC Review vol. 13, No. 3, 1998.
A Tri-Axial Accelerometer Interface For The Transmission of Impact Measurements, Heather Marandola et al. Sunfest, 2000.
Distributed Low-latency Rendering for Mobile AR, W. Pasmas et al., pp. 107-113, IEEE 0-7695-1371-1/01, 2001.
Mobile Collaborative Augmented Reality, Gerhard Reitmayr et al., pp. 114-123, IEEE 0-7695-1371-1/01, 2001.
Augmented maintenance of powerplants: A prototyping case study of a mobile AR system, Gudrun Klinkar, pp. 124-133, IEEE 0-7695-1371-1/01, 2001.
Dynamic Virtual Convergence for Video See-through Head-mounted Displays: Maintaining Maximum Stereo Overlap throughout a Close-range Work Space, Andrei State et al, pp. 137-146, IEEE 0-7695-1371-1/01, 2001.
Optical See-Through Calibration with Vision-Based Trackers: Propagation of Projection Matrices, Yakup Gene et al, pp. 147-156, IEEE 0-7695-1371-1/01, 2001.
A New System for Online Quantitative Evaluation of Optical See-Through Augmentation, Erin McGarrity, pp. 157-166, IEEE 0-7695-1371-1/01, 2001.
MR2 (MR Square): A mixed-Reality Meeting Room, Kiyoshi Kiyokawa et al., pp. 169-170, IEEE 0-7695-1371-1/01, 2001.
Testing Information Delivery Methods Using Augmented Reality, Dr. Paul Jackson, pp. 171-172, IEEE 0-7695-1371-1/01, 2001.
A Quick Method for Synthesizing Photorealistic Color Images under Various Illumination Conditions, Li Shen et al., pp. 173-174, IEEE 0-7695-1371-1/01, 2001.
Real-Time 3D Object Recognition for Automatic Tracker Initialization, Gabor Blasco et al, pp. 175-176, IEEE 0-7695-1371-1/01, 2001.
Tinmith-evo5—An Architecture for Supporting Mobile Augmented Reality Environments, Wayne Piekarski et al., pp. 177-178, IEEE 0-7695-1371-1/01, 2001.
Taking AR into Large Scale Industrial Environments: Navigation and Information Access with Mobile Computers, pp. 179-180, IEEE 0-7695-1371-1/01, 2001.
Mobile AR5ALL, Christian Geiger, pp. 181-182, IEEE 0-7695-1371-1/01, 2001.
Linear Solutions for Visual Augmented Reality Registration, Adnan Ansar, pp. 183-184, IEEE 0-7695-1371-1/01, 2001.
Augmented Reality (AR) for Assembly Processes—An Experimental Evaluation, S. Wiedenmaier, pp. 185-186, IEEE 0-7695-1371-1/01, 2001.
Illuminating the Mixed Reality Stage; Applying Complex Lighting Conditions to AR, Michael Wittkamper et al., pp. 187-188, IEEE 0-7695-1371-1/01, 2001.
Real-time and Markerless Vision-Based Tracking for Outdoor Augmented Reality Applications, Didler Stricker et al., pp. 189-90, IEEE 0-7695-1371-1/01, 2001.
3D reconstruction of the operating field for image overlay in 3D-endoscopic surgery, Dabien Mourgues, pp. 191-192, IEEE 0-7695-1371-1/01, 2001.
Living in a Computer Augmented Environment, Jun Rekimoto, pp. 193, IEEE 0-7695-1371-1/01, 2001.
Augmented Reality as a New Media Experience, Blair McIntyre et al., pp. 197-206, IEEE 0-7695-1371-1/01, 2001.
Dynamic Shader Lamps: Painting on Movable Objects: Deepak Bandyopadhyay, pp. 207-216, IEEE 0-7695-1371-1/01, 2001.
Using a head-Mounted Projective Display in Interactive Augmented Environments, pp. 217-223, IEEE 0-7695-1371-1/01, 2001.

\* cited by examiner

425

PICK LOCATION BASED GAME

1) PACMAN
2) Frogger
3) Track
4) SPACE INVADERS
5) BUBBLES
6) TREASURE HUNTERS
7) ZELDA
8) PONG
9) Football

450

YOU PICKED PACMAN!

PACMAN is a location-based game, pressing OK will mark your current location as pacman's origin in the maze. Press OK to begin. You will need an open area of 200 feet x 200 feet to play the game.

475

PACMAN IS A MULTI-PLAYER GAME

If you want to play with a remote player press 1 and enter in player device ID or send this game ID, ID#PAC52312, to player.

If a local player wants to join, have player place device within 1 feet of this device.

MULTIPLAYER FOUND

One additional device has been found. Chose your character from the list of available characters.

1) PACMAN

2) Ghost

550

Rules for Actuality PACMAN

Actuality PACMAN lets you play as PACMAN. Since you have selected Pacman, your mission is to literally run through the maze, your device will represent pacman's location, and gobble pellets while you flee ghosts (3 computer controlled, 1 player controlled). When powered up, you can consume ghosts, you cannot go through walls. Hitting a wall will recalibrate or position (or in certain modes simply cost you 100 points).

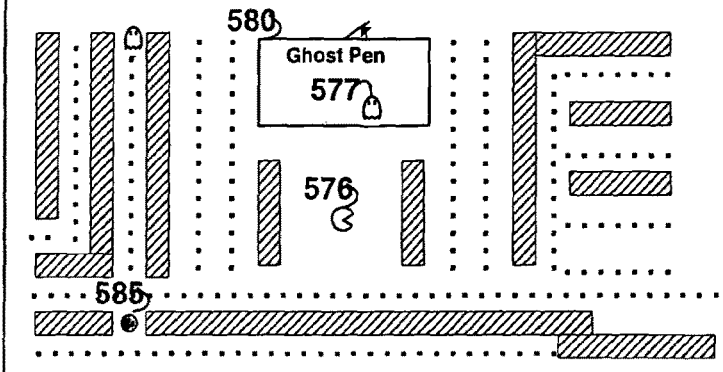

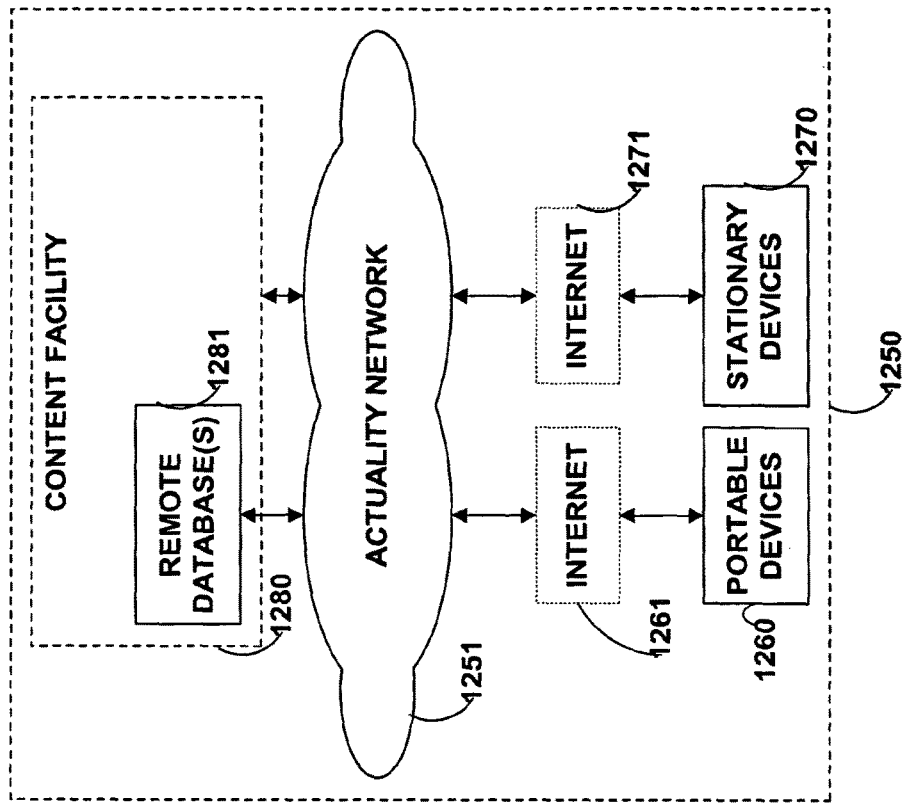
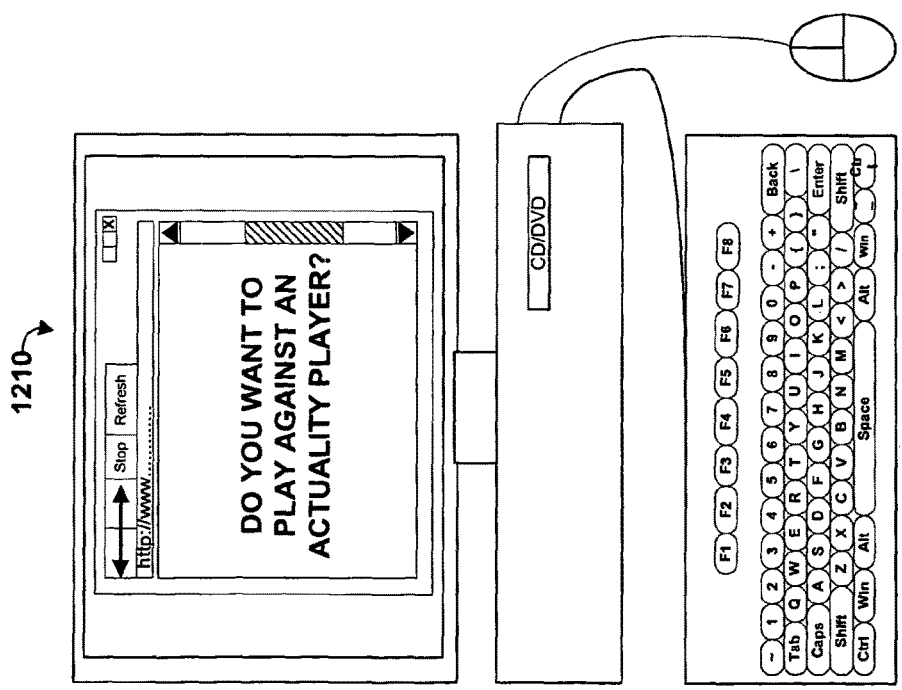
FIG. 12

1300

SYSTEMS AND METHODS FOR LOCATION BASED GAMES AND EMPLOYMENT OF THE SAME ON LOCATION ENABLED DEVICES

CROSS-REFERENCE TO RELATED APPLICATION

This application is a continuation of U.S. patent application Ser. No. 10/932,536, filed on Sep. 1, 2004, which claims the benefit of U.S. Provisional Application No. 60/499,810, filed on Sep. 2, 2003, both of which are incorporated by reference herein in their entirety.

U.S. patent application Ser. No. 10/932,536, filed on Sep. 1, 2004, also claims the benefit of U.S. Provisional Patent Application No. 60/603,481 filed on Aug. 20, 2004 and titled "Wireless Devices With Flexible Monitors and Keyboards," both of which are hereby incorporated by reference herein in their entirety.

BACKGROUND OF THE INVENTION

This invention relates to video games and video game systems.

Virtual reality games have been developed where a user places a helmet on his/her head and is immersed into an alternate reality via a display located in the helmet. This user is then allowed to move through an alternate reality by means of a joystick. The user is displayed the alternate reality from a first person perspective. A user is limited in actual physical movement by means of a very small (e.g., 48 inches) enclosed virtual reality platform. Such traditional virtual reality systems are deficient because of the need for additional, unneeded manual actions to be made to move a joystick in order to move the user through the alternate reality. It is therefore desirable to provide a game system with improved user controls.

Traditional virtual reality systems are also unsafe because a user cannot visually see his/her physical environment. Guard rails are typically provided such that a user cannot stray from the virtual reality platform. Yet, a user may become distorted in the alternate reality and lose a sense of direction as to where such rails are located. Thus, a user may dangerously contact such guard rails or foreign objects introduced onto a virtual reality platform. It is therefore desirable to provide safer game systems.

Traditionally heavy computer hardware, multiple platforms, large interconnection wires, and numerous manual control devices are required to immerse more than one user in the same alternate reality. Such virtual reality systems typically cost in the tens of thousands, to hundreds of thousands, of dollars. It is therefore desirable provide an economical video game system with improved functionality. It is also desirable to provide software that can realize improved gaming systems in traditional devices such as wireless telephones.

Zingy.com offers wireless telephone ringers for sale and download. Zingy.com allows a user to enter in a wireless telephone number and a corresponding wireless telephone model a website. The user, however, must set up a user profile through a user identification process that includes sending a text message containing a confirmation code to the wireless telephone number. A user must enter in this confirmation code on the website to confirm that the user is in possession of the wireless telephone. Desired ringers must be paid for, and downloaded, one at a time. After a particular ringer has been purchased, that user is sent, via a text message, a Wireless Access Protocol (WAP) address. Such an address must be manually extracted from the text message, or entered directly into a browser, in order to be directed to the location of the desired ringer. The user's wireless telephone will then ask the user if the material is OK to download. Only one ringer may be downloaded to a wireless device at a time. It is therefore desirable to provide improved data interchange capabilities for a wireless device.

Sprint offers a VISION PCS service in which the internet location of a Global Content Descriptor file (.GCD file) must be sent, via text messaging, to a Sprint VISION PCS wireless telephone in order to download a file (e.g., a ringer) from a website (e.g., Zingy.com). This GCD file contains a variety of data fields that tell the wireless telephone, the size of the file, the title of the file, the creator of the file, the file type, and file's internet storage location. Traditional wireless telephones contain programs that use the information of the GCD file. For example, if the size of the file, as described by the GCD file, is too large then the wireless telephone will prompt the user that the file is too large to download. Such systems are deficient because two files must be transferred in order to manually obtain a download of a single file. It is therefore desirable to provide a wireless telephone that does not need to download a .GCD file, or a similar file, in order to download content.

SUMMARY OF THE INVENTION

The present invention provides an actual, reality-based video game in which a user's physical (actual) location on a playfield, reflects a virtual game character's virtual location in a video game environment. In this manner, an actual-reality (hereinafter "actuality") video game system may be provided. Generally, an actuality game is a location-based game where a user's location on a physical playfield corresponds to a video game character's location on a virtual video game playfield. Multiple types of other location-based games are also provided.

Multiple type of displays are provided that realize a variety of different types of location-based games. For example, a gaming system is provided in which a user's actual environment is completely visible to a user. In this manner, a game system that provides a visible physical playfield may be provided. A display (e.g., a monitor) may be provided to display the video game to a user. A location device may be included in the video game system such that the actual location of the video game system may be obtained and utilized, for example, to control the location of a virtual video game character on a virtual playfield. In this manner, the user is provided as choice whether or not to view either the physical playing field or the game system display while operating the game.

As per another example, a game system is provided with a transparent display such that virtual indicial may be presented on portions of the display. Such virtual indicia may be configured to block, manipulate, or overlay a portion of a user's actual, physical environment. In this manner, a game system that provides a semi-visible physical playfield may be provided. Such displays may be, for example, flexible, transparent, and head-mounted display. Alternatively, such virtual indicia may be displayed directly on the retina through the use of light emitting elements. One advantage of a semi-visible environment game system is that the system allows a user to travel safely at fast speeds through a physical environment. The is because the user may be able to see all of, or part of, his/her physical environment.

In such a game system that provides a semi-visible environment, a user may go to a soccer field, mount a semi-visible environment gaming system display over his/her field-of-view, download a "goalie" video game, and practice blocking penalty kicks that are shown through the display. Expanding this example, as a virtual ball is virtually kicked on the head-set, the user may change locations to try and block the ball. In this manner, the gaming system may use the user's location to render the next frame of images display on the user's display. Thus, if a user moves one foot to the left towards the ball, the video game system may render the ball to be one foot closer to the user in the next frame.

Yet another game system is provided in which the video game display completely immerses a user into a virtual reality so that a user cannot see his/her physical environment. In this manner, a game system that provides a non-visible physical playfield may be provided. Location information may be utilized, for example, to determine a virtual character's location (e.g., a particular first-person perspective) in the virtual realm.

At any time during gameplay, a user's location may be used as a reference by the video game or another user's video game. For example, a child in his/her backyard in the U.S. may play a game of virtual PACMAN with his/her father that is located in a park in Japan. At the beginning of such a multiplayer game, information about the starting location of each user may be utilized as a points of reference for the game. Accordingly, the game system may transmit the child's location with respect to the child's starting location to his/her father's game system. The father's game system may then utilize this information to determine where the child would be if the two user's were playing on the same physical playfield. Accordingly, the father and child may play the same actuality game together even though the father and the child are on opposite sides of the world.

A visor may be provided that includes a transparent display such that virtual objects can be overlayed/placed onto the user's actual, physical environment. If the game is a reincarnation of the classic game of PACMAN, maze walls may be provided to a transparent display. Thus, a user may see the actual environment that the user is running through (e.g., the actual, physical playfield) and also see the maze walls that he/she has to follow (e.g., the virtual playfield).

Any device with a locating device and a display may be programmed to be at least a visible environment game system. For example, a wireless telephone with a Global Positioning System (GPS) system may be utilized as a visible environment game system that plays, for example, actuality games. As introduced above, one actuality game may be a reincarnation of the classic game of PACMAN. Such a game may include a multiplayer mode where multiple players may simultaneously play the game. Control of, for example, PACMAN may be provided by changing the location of the wireless telephone. A different player could use a different game system (e.g., a different wireless telephone) to control a ghost in the same game. Such a different user may be located on a remote playfield (e.g., in a park in Japan). Thus, a user may look down at a display screen, see his/her character, and run around his/her physical environment in order to similarly run his/her virtual character through a virtual maze. Communication devices may be included in such multiplayer game systems such that individual gaming systems may communicate location information to each other or a remote storage device. Such a remote storage device (e.g., a remote database) may be periodically updated with each user's location information and periodically accessed by each user's device to obtain, for example, the other user's location. Accordingly, the ability of a wireless telephone to transmit/receive data may be utilized to realize multiplayer actuality games or other location-based games. Alternatively, the devices may establish a direct communications link with each other.

Additional locating devices, or directional devices, may be placed on a user to obtain additional transparent controls (e.g., controls where a user does not have to perform an unnatural action). For example, a GPS device (or any type of locating device) may be placed on a user's hand. A hand-word locating device may be used to obtain the location of a user's hand in a three-dimensional field. Therefore, the height, latitude, and longitude of the user's hand may control the height and position of a virtual game character's hand (or other movement).

As per another example, a locating device may be provided on a head-mounted display that determines how the head-mounted display moves with respect to a reference point. In this manner, the video game may be provided with signals representative of the direction that the user's head is pointed towards. A directional electronic compass is also provided through the configuration of two location devices (e.g., two GPS devices). If, for example, one location device is placed in one location of a portable gaming system (e.g., the front of a visor) and a second location device placed in a second location of the portable gaming system (e.g., the back of a visor) then the direction the visor is pointing may be determined be determining the location of these two location devices.

Additional locating and/or directional devices may be provided on other actual objects (e.g., a sword, gun, baseball bat) such that the location of these objects may also be utilized to provide input to the location-based video game. For example, multiple locating devices may be provided in a baseball bat such that a user may play an actuality game of baseball.

Simplistic examples of a location-based game system are provided (e.g., a dedicated non-communicating one-player game system). Such systems may be constructed and marketed for considerably less than conventional hardware (e.g., less than the cost of a wireless telephone).

Additional manual controls may be provided to increase the functionality of a game system of the present invention. Such manual controls may be, for example, buttons and/or joysticks.

A data interchange may also be provided. Users may upload content from a wireless telephone and allow different users (e.g., selected users) to download content to their different wireless devices (e.g., a wireless Personal Electronic Device). Interactive games are provided to wireless telephones by, for example, including a database that can store a player's progress in the game.

An automatic content update, or an automatic content download, may be provided to a wireless telephone user. Such an update may be the result of a paid subscription for such periodic updates. A wireless telephone is provided that includes the ability to have non-service provider automatic updates without the consent of the wireless telephone's user every time data is downloaded. A wireless telephone is also provided that is operable to download a file directly without a .GCD, or similar, file.

Conversion components are also provided that may provide a location-based game functionality to a non-located enabled device. For example, a peripheral with a game, a locating device, and a wireless transmitter/receiver, may is provided that may interface with a particular non-location enabled device. Such a peripheral may be operable to interface with PCMCIA slots or USB ports. In this manner, a laptop user may purchase a conversion component so that the laptop is operable to play a particular location-based game or take on the attributed of a location-based gaming system.

A stationary game system is provided that interacts with an actual-location based video game system of the present invention. In this manner, a user of a stationary gaming system (e.g., a home Personal Computer) may play a game against the user of an actuality gaming system. Using PACMAN as an example, the stationary user may control a ghost with a joystick while the location-based user controls PACMAN with his/her physical location on a physical playfield. A handicap may be given to the stationary user such that the actual-location based user is provided with an advantage (e.g., the handicap's player may move slower).

BRIEF DESCRIPTION OF THE DRAWINGS

The above and other features of the present invention, its nature and various advantages will be more apparent upon consideration of the following detailed description, taken in conjunction with the accompanying drawings, in which like reference characters refer to like parts throughout, and in which:

FIGS. 4-5 are illustrations of user interfaces, and accompanying functionality, constructed in accordance with principles of the present invention;

FIG. 12 is an illustration of a gaming system network constructed in accordance with the principles of the present invention;

DETAILED DESCRIPTION OF THE DRAWINGS

U.S. patent application Ser. No. 10/400,296 filed on Mar. 25, 2003 titled "Systems and Methods for Locating Wireless Telephones and Security Measures for the Same" is hereby incorporated by reference herein in its entirety.

U.S. patent application Ser. No. 10/797,801 filed on Mar. 9, 2004 titled "Systems and Methods for Providing Remote Incoming Call Notification for Wireless Telephones" is hereby incorporated by reference herein in its entirety.

Figure 1:
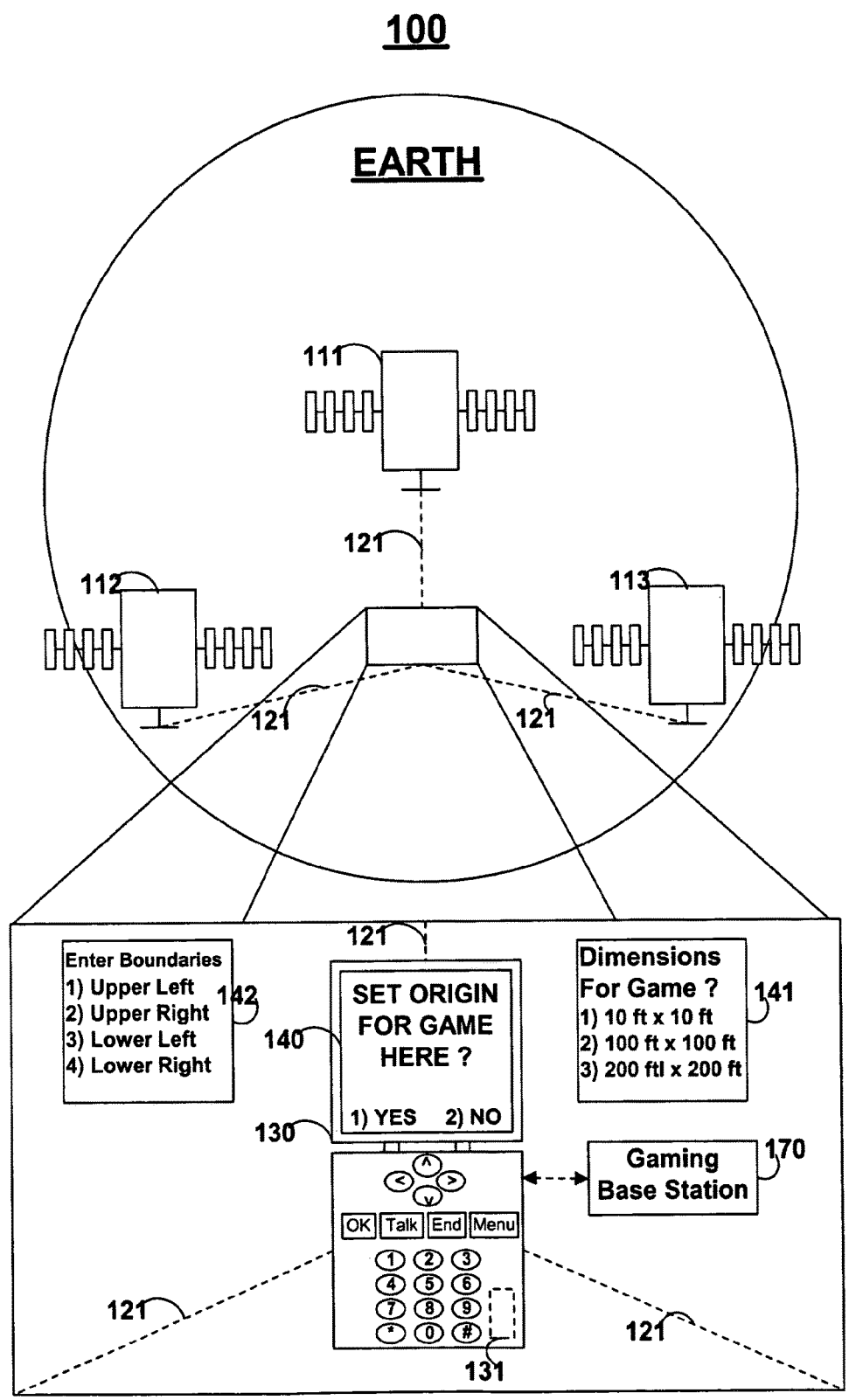
FIG. 1 is an illustration of one embodiment of a gaming system topology constructed in accordance with the principles of the present invention.

FIG. 1 shows gaming system 100 in which locating device 131 receives location signals from satellites 111-113. Persons skilled in the art will appreciate that satellites 111-113 may be transmitters placed around a physical playfield (e.g., may be placed around/suspend above the perimeter of a physical playfield). Wireless telephone 130 may house locating device 131 and may provide a location-based game on display 140.

To initiate a location-based game, a user may be prompted to set an origin for the game trough a Graphical User Interface (GUI). Alternatively, an origin may be set automatically. Furthermore, a GUI may be provided that prompts a user on how much free physical space is needed on all sides of the origin for gameplay. Such a functionality may allow a user to locate a proper spot on an actual, physical playfield before gameplay begins or to allow a video game to establish a reference location. The dimensions of the physical playfield may be operable to be changed by a user. For example, a user may be provided with a number of physical playfield dimensions to choose from as shown in GUI 411.

In multiplayer embodiments, for example, a user may determine playfield dimensions and an opponent may be, for example, requested to confirm that user's selected dimensions (or display that user's selected dimensions). Alternatively, each user may select different dimensions for their local, physical playfield and control signals may be appropriately scaled as will be discussed below. Default dimensions for the physical playfield may be utilized by a video game and displayed to a user. Such dimensions may be changed during operation of the video game (e.g., a game may be PAUSED, taken to a different physical, playfield, and the physical playfield dimensions may be changed before the game is RESTARTED).

Persons skilled in the art will appreciate that location-based video games may be initially configured in a variety of ways by a user. For example, a user may be provided with a GUI that includes a number of choices as to the shape of an physical playfield (e.g., a circle, square, or rectangle). As per another example, GUI 412 may be provided in which a user may go to a physical playfield boundary that the user desires and establish that location as a location boundary for a game. Dimensions information may be utilized by a video game system to determine how to scale location-based inputs. For example, if a user is playing an actuality game of PACMAN then a user movement in a 10 ft.×10 ft. physical playfield may result in PACMAN moving faster than that same user movement in a 100 ft.×100 ft. foot physical playfield. Accordingly, a video game system may scale location inputs such that a person playing on a 10 ft.×10 ft. playfield may play in the same virtual playfield (although multiple displays may display the virtual playfield) as a user playing on a 100 ft.×100 ft. playfield. A program may scale user inputs based on, for example, the dimensions (e.g., size) of both user's playfield or scale to a user defined or default playfield. Control signals may be transmitted to other game systems such that scaling is taken into account. For example, transmitted control signals may represent the direction and magnitude that a current player's location is away from that user's origin. Dimension information for a user's physical playfield may also be transmitted to other user's game system. Using any one of a number of scaling methods, a user's movement North of his/her physical playfield origin by 10% may cause an opponent to view, on the opponent's display, movement of the user's video game character to a location 10% North of the opponent's origin.

Persons skilled in the art will appreciate that a variety of locating devices may be utilized. For example, a Global Positioning System (GPS) may be utilized. Alternatively, a Local Positioning System (hereafter "LPS") may be utilized. Additionally, the difference in two locations provided by a locating device (e.g., the magnitude and direction of a location to an origin) may be utilized to move a character in a video game playfield (or provide other control signals to the video game system). Similarly, devices that measure movement (e.g., an accelerometer) may be utilized as a locating device. Accordingly, acceleration information may be translated into location information and this location information may be utilized as a control signal (e.g., for changing the location of a video game character).

Person skilled in the art will also appreciate that any type of device may be configured into a gaming system of the present invention. In addition to wireless telephones (e.g., cellular or PCS wireless telephones), laptops, Personal Digital Assistants (e.g., PDAs), Blackberries, Personal Electronic Device (PED), iPODs, or any other portable electronic device may be utilized.

Multiple portable gaming systems may be operable to directly communicate with each other (e.g., Cellular, PCS, WiFi, radio, satellite, or infrared communications) in order to achieve a variety of functionality. For example, portable gaming systems may communicate location information directly with one another in order to increase the speed in transferring location information. Alternatively, one or more remote storage devices (e.g., a database or memory) may be provided that stores location information for one or more users. Portable gaming devices may routinely retrieve other user's location information from such a remote storage device. Portable gaming devices may also routinely write location information for a particular user to such a remote storage device either periodically, continually, or as soon as a new location reading has been completed.

To decrease the weight of a portable gaming device, a base station (e.g., base station 170) may be provided that includes components that may otherwise be included in a portable gaming system. For example, a satellite communications device may weigh more than a WiFi device. In this manner, a WiFi transmitter/receiver may be included in the portable gaming device to relay the portable devices location information to the base station. The base station may then use, for example, the satellite communications transmitter/receiver to update location information on a remote storage device. Alternatively, the base station may include, for example, the remote storage device for one or more portable devices.

Base stations (e.g., base station 170) may also include a majority of the processing circuitry for a gaming system. For example, a portable gaming device may be provided with a display, a locating device, and a transmitter/receiver. This portable gaming device may periodically transmit location information to a base station. The base station may use this information as an input to a video game being played, render a new frame for the portable display, and forward this newly rendered frame (that takes into account the impact of the new location-based control signal) to the portable gaming device. Multiple portable devices may utilize one base station. Similarly, one portable device may utilize multiple base stations. Base stations may also communicate information between each other.

Figure 2:
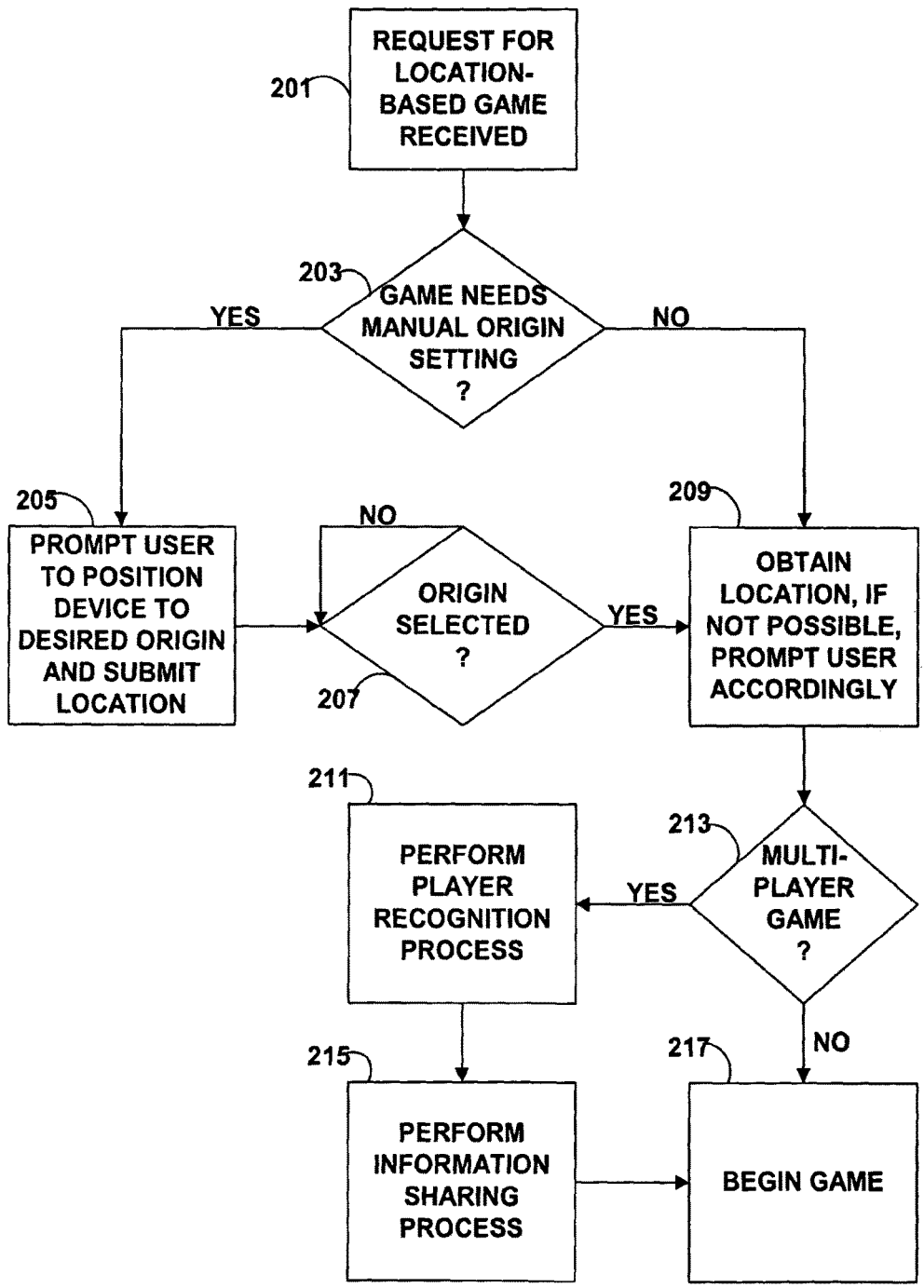
FIG. 2 is a flow chart for a variety of functionalities that may be included in a gaming system constructed in accordance with the principles of the present invention.

FIG. 2 shows flow chart 200 that includes a variety of different functionalities that may be included in a location-based gaming system. Persons skilled in the art will appreciate that any number of steps may be added to, or removed from, flow chart 200. Generally, flow chart 200 may be utilized in a location-based game where the location of a user on a defined physical playfield, or that user's latitude/longitude information in the world, is utilized as a control signal to a location-based game. In one embodiment, such control signals may, for example, replace a tradition joystick such that a user's physical location is utilized as the main control device for a game (e.g., control a character's location in a video game's virtual playfield).

Step 201 occurs when a request for a location-based game is received. This may be simply a user turning ON a location-based gaming system (e.g., turning ON a dedicated PACMAN location-based system) or a user selecting a location-based game from a list of location-based games. If a list of games is provided such games may be stored locally (e.g., on the gaming system). Alternatively, the list may be stored remotely, or locally, and a selected game may be downloaded from a remote location (e.g., wirelessly from a remote database). A cost may be associated with such location-based games and a user may be required to agree to purchase the game or rent the game for a period of time. Such game downloads may be free of charge. A subscription (e.g., an yearly or monthly billed subscription) may be purchased by the user such that all location based games are free to download while the subscription lasts (e.g., has not expired). Alternatively, an amount of time for gameplay may be purchased (e.g., 10 hours).

Step 201 may alternatively commence when a user starts a game on a location-based gaming system. Step 201 may also commence when a user agrees to join a game (e.g., a different user requests that the user plays a multiplayer location-based game).

Step 203 determines if the game needs an origin setting. Persons skilled in the art will appreciate that many embodiments of a location-based gaming system may operate without the need to set an origin. For example, the longitude and latitude of the location of a user in the world may be utilized as a control signal. For example, if the location-based game is a single-player game of PACMAN then the game may utilize multiple instances of the user's location to determine the change in location and translate this change in location into a control signal to move PACMAN through a virtual video-game playfield such as a maze. As per another example, an origin-functionality may not be utilized, although it may be utilized in some embodiments, in a location-based game where the actual location of a user in the world is a control signal. For example, one location based game may provide control signals depending upon the city that the user is located in (e.g., New York City may cause one control signal to be provided while Washing D.C. may provide a different control signal to be provided). If a game does utilize an origin setting then, for example, step 217 may occur.

As stated above the game may autonomously set an origin for the game. As such step 209 may be initiated from step 201. In this manner, step 203 may not be included in a gaming system. Generally, step 203 is included to emphasize the varieties of gaming systems that may be provided.

If a game, or gaming system, needs a manual origin setting then, for example, step 205 may occur. Step 205 may prompt a user to position the device at a desired origin. Step 207 may then wait for a user to submit the origin (e.g., for a user to select a physical location as the start of a game). Persons skilled in the art will appreciate that even if an origin is not utilized by a video game, or video game system, that a user may still be provided with a display screen that allows a user to find a clear area before gameplay. In this manner, a "when you find an open area, and are ready to begin gameplay, press OK" display screen may be provided for a game, or game system, that does not utilize an origin as a reference location. Persons skilled in the art will also appreciate that in some embodiments, a user may select a perimeter by, for example, going to locations on the perimeters (e.g., the corners of a rectangle) and recording these perimeter locations. The video game, or video game system may utilize such perimeter locations to derive an origin. An origin-based game may, or may not utilize, perimeter locations. Additionally, setting a perimeter may encompass a variety of embodiments. For example, a location reading outside of a perimeter may still be utilized as a control signal (e.g., to deduct a particular number of points from a user's score). Alternatively, only location readings inside (and possibly even on) the perimeter may be utilized by a particular gaming system embodiment.

Step 207 may reiterated until a user selects a location as the origin for gameplay. Once a user selects a location for the origin of gameplay the device may record (e.g., in local memory or in remote memory such as a remote database) the location of the selected origin (e.g., by obtaining the location from a locating device) and use this location as a reference location during gameplay. Multiple features may be provided as the result of including, for example, one or more reference/origin values. As shown above, one such feature may be a multiplayer feature where the players may be located on different physical playfields.

Step 209 may be initiated, for example, after an origin is selected in step 207 or autonomously after step 203, or step 201, occurs. Step 209 may then take a reading of one or more locations for a user's locating device to determine a reference location (e.g., an origin). Step 209 may obtain location information for a period of time (e.g., 1 minute) and average the location information together to obtain a reference location. During this time a display screen may be displayed to the user along the lines of "stay perfectly still while we calibrate the game with your current location." Persons skilled in the art will appreciate that additional configuration steps may be provided. For example, a user may be asked to take a step forward and a step back, and shown the speed of the movement of a video game character based on that movement so the user may determine if the game-speed is acceptable (and if not, change the perimeter of the game or the scaling of user movement to character movement). In this manner, step 209 may also begin tracking the user's location continually, or periodically.

At any time, a user may be prompted if a multiplayer game is desired. For example, a user may be prompted if a multiplayer game is desired in step 213. Step 211 may be included in flow chart 200 to located nearby players that can play the game. For example, a communications device may send out a signal to determine if any other similar, or compatible, devices are on the physical playfield (or a surrounding area). Alternatively, a player exchange may be provided in which the communications device sends a signal to the exchange noting that the user is desires to play a particular game in a multiplayer mode. If another player desires to play the game on the exchange then, for example, the two player's gaming systems may autonomously be configured with information about each others origin so that a multiple-player game may be initiated. Persons skilled in the art will appreciate that the origin of a users device does not need to be transmitted to the other users in a multiplayer game. Instead, control signals may be translated into control signals that a different user's device may utilize. For example, instead of transmitting an origin, a device may transmit a signal that represents a particular distance and direction (e.g., 5 feet North or 10% North of the physical playfield). Generally, such multiplayer control signals may assume that each user started at an origin and that each user's device recorded such an origin. As can be seen, multiple methods may be utilized to SYNC the location-aspect of multiple location-based gaming devices.

Various other multiplayer configurations may also be provided. For example, a user may enter in the phone number of a wireless telephone and request if the user of that wireless telephone wants to play a multiplayer game wants to be played. Accordingly, the requested wireless telephone may be anywhere (e.g., halfway across the world) and still be requested to commence play on the same virtual, video-game playfield (e.g., by uploading data to a remote server or communicating directly with the wireless telephone). Step 215 may be utilized to initialize any communications link needed between the gaming devices (e.g., communications to a common remote memory device such as a database). Step 217 may be utilized to begin gameplay of a location-based video game.

Figure 3:
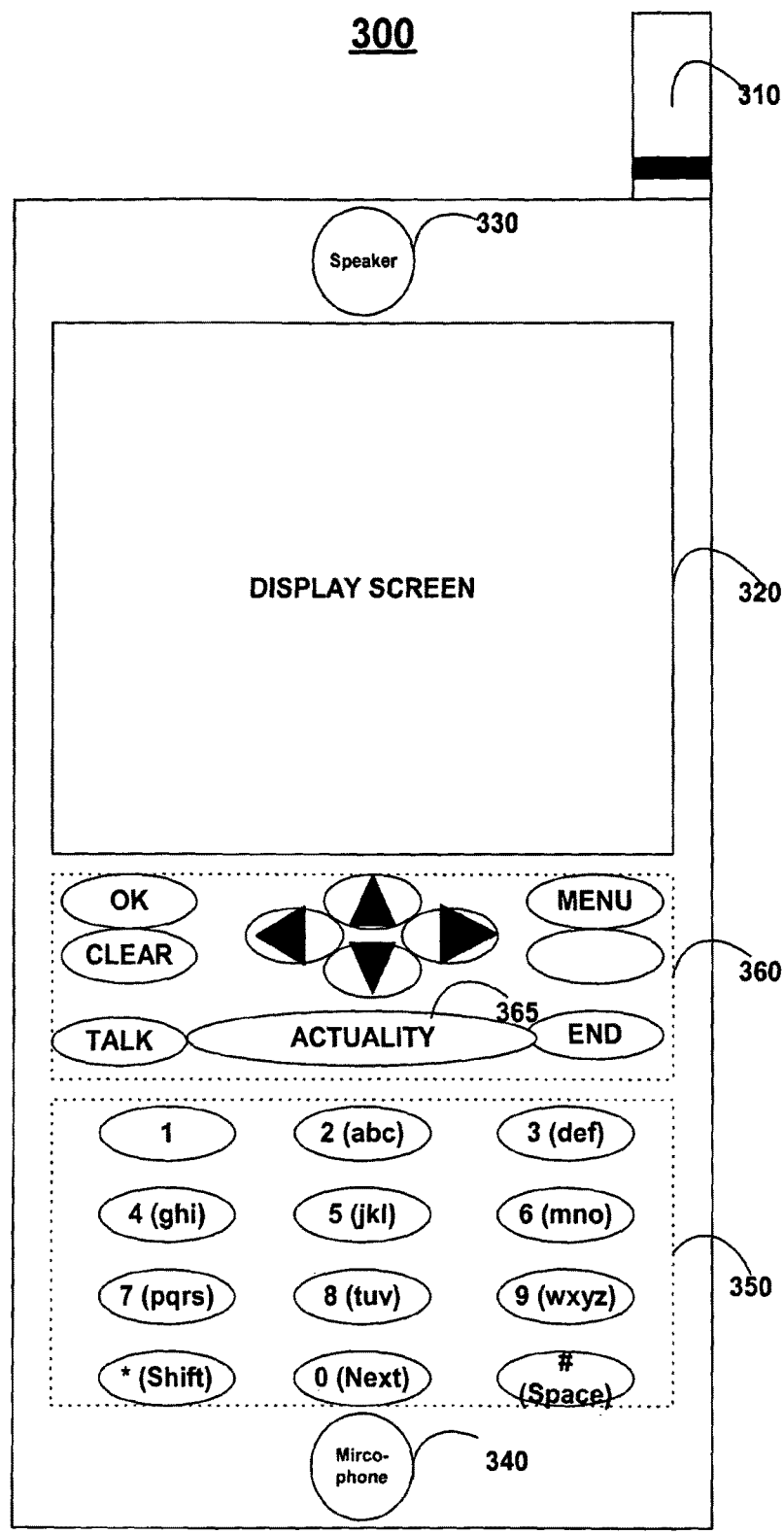
FIG. 3 is an illustration of a wireless telephone for use as a gaming system constructed in accordance with the principles of the present invention.

FIG. 3 shows wireless telephone 300 constructed in accordance with the principles of the present invention. Wireless telephone 300 preferably includes speaker 330, antenna 310, display screen 320, control keys 360, alpha-numeric keys 350, and microphone 340. Wireless telephone 300 also preferably may include, for example, a communications transmitter (not shown), communications receiver (not shown), memory (not shown), positioning device such as a GPS or LPS (not shown), and a microprocessor (not shown). Control keys 360 may include any number of joystick, control buttons, or other user interfaces (e.g., speech recognition controls). Such control keys 360 may be utilized to provide, for example, additional control signals to a location-based game or gaming system (e.g., a control may be utilized as a FIRE or ACTION button). Controls may also be included in wireless telephone 300 that are directed to location-based games and, in some instances, are used exclusively for location-based games. For example, ACTU-ALITY button 165 may be included on wireless telephone 300 that, when pressed, provides a location-based game, a list of location-based game, or a location-based game service. The use of ACTUALITY button 165 may alternatively, automatically log a user into a location-based game network that may provide not only location based games but additional information such as, for example how many users are requesting opponents for a particular game.

Persons skilled in the art will appreciate that a gaming device dedicated to a single game (e.g., FROGGER) may be easily incorporated into a device the size of, for example, a traditional Tamagochi device. Such dedicated devices may be sold relatively cheaply (e.g., $40). A gaming device may also accept cartridges of different games so as to reduce the need of purchasing a new location device with the purchase of a game. As discussed above, games can also be wirelessly downloaded to a portable gaming device or a traditional commercial device if that commercial device includes, for example, a locating device.

FIG. 4 shows display screens 425, 450, and 475 that may be provided to a gaming device.

Display screen 425 displays a list of location-based games that a user can choose from. Display screen 425 may display information other than just the title of each game. For example, display screen 425 may also display the dimensions of the physical playfield that is needed to play the game (or the preferred or default dimensions). Display screen 425 may also display information related to if a different user has requested an opponent to play the game (or the number of different user's waiting for an opponent). Any game list be scrollable, or partitioned into multiple display screens, such that a large number of games may be included on the list.

The games on such a list may be stored locally (e.g., in onboard memory) or remotely (e.g., on a remote database). Additional information that may be displayed on display screen 425 may include whether or not a user has purchased such a game, the amount of time left in a rental period for a game, the size of the game (e.g., 1 MB), and information about the gaming device (e.g., 100 MBs of memory available). Any other type of information may be included on any display screen described herein.

Display screen 450 is one example of the information that may be presented when a location-based game is chosen. Display screen 450 may also contain a static (e.g., transparent) origin functionality such that when a user acknowledges reading the instructions, the system will autonomously record an origin location. As stated above, an origin does not have to be set for a location-based game to be played where movement on a physical playfield correlates to a video game character's movement on a virtual video game playfield.

Display screen 475 is one example of a multiplayer initialization screen and accompanying functionality. More particularly, display screen 475 may include additional information such as how to, for example, initiate a multiplayer game. In one multiplayer embodiment, the gaming device may generate a gaming code unique to that device. Such a code may, for example, include information about the location device and the game being requested. For example, ID#PAC52312, as illustrated, may include PAC to correspond to a particular game (e.g., PACMAN) and 52312 to correspond to the ID of a particular device (e.g., a telephone number) or a particular user that is logged into a device (e.g., user 52312). As in another multiplayer embodiment, a gaming device may include a communications receiver/transmitter to locate if one or more other devices are within range. Such a multiplayer signal may be signaled upon request of a particular multiplayer game. For example, display screen 465 may be initiated if "PACMAN (MULTIPLAYER)" is chosen from a list of games.

FIG. 5 shows display screens 525, 550, and 575.

Display screen 525 is a screen that allows a user to chose from a variety of characters for gameplay. In this manner, display screen 525 may be utilized in a multiplayer game such that each player may chose a different character or in a single player game. These characters may have different modes of operation (e.g., different goals, gaming constraints, and characteristics). For example, in PACMAN the goal of PACMAN is to eat pellets and run away, at times, from four ghosts. The ghosts, however, have a goal of killing PACMAN. Each ghost may, however, have different speeds (e.g., different characteristics). Player characteristics may include for example character speed, weapons, fighting styles, ability to do particular actions, or any other characteristic.

Display screen 550 may provide the user with a rule-set for the player that is chosen from display screen 525. A location-based game where a user's actual physical location on a physical playfield correlates to a video game character's location on a virtual video game playfield may require that the operational rules of current game be changed. Using PACMAN as an example, in the classic PACMAN, PACMAN is not operable to stray close to maze walls. In an actuality PACMAN game, however, a player may stray close to maze walls and even come into contact with maze walls. Hitting a maze wall may be similar to a user contacting, or passing through, a perimeter of the video game playfield. In this manner, functionality is provided for this scenario. For example, a user may be deducted a particular number of points if that user contacts a maze wall, a game's perimeter/boundary, or an object that a video game character cannot pass through and/or cannot use. For the purposes of this application, such objects will be referred to as impenetrable objects. One alternative to reducing points is to stun the character for a period of time (e.g., not allowing the video game character to move for a period of time), reduce the number of lives of that character (e.g., reduce the number of character lives left by 1), or end the game (e.g., display "GAME OVER" to the user).

As per another example, the gaming system may be configured to stop the movement of a video game character when a user travels through the location on a physical playfield that correlates to an impenetrable object on a virtual playfield. Thus if a user travels to through a wall, PACMAN may be left behind on the side of the wall that the user penetrated. The game may be configured such that the user may regain control of the video game character by returning to, or near, the location where the video game character was left behind.

Display screen 575 includes one embodiment of a screen shot from a location-based game, particularly an actuality game PACMAN game. Virtual character 576 is first displayed to a user at the virtual character's origin. As a player moves around a physical playfield, the player's actual location may be translated into a virtual location for virtual character 576. As mentioned above, one of the many ways in determining virtual character movement may be by determining the difference and direction between the user's current location and his/her origin location. Such information may be stored, retrieved, and/or processed as a vector. Thus, as a user runs through a playground, character 26 may through the virtual environment of display screen 575. If vectors are used as control signals, these vectors may be communicated to other players such that a multiplayer game is realized. Such vector sharing may be desirable in order to keep the actual location of a user private from opponent users. A user may, however, give an opponent permission (e.g., access to) his/her location such that, for example, the opponent can travel to the same physical playfield as the user.

Character 577 may be a second character controlled either by a program or by a second player. Character 577 may have a different origin on display screen 575. In this manner, a user may be physically directed to an origin after the first player sets his/her origin so that they are both properly aligned on the physical playfield. At any time, a display screen, or a portion of a display screen, may include an outline of a playfield and the user's location on that playfield. If a player has to go to a particular area of the playfield (e.g., to a particular origin position such as area 580) then this display screen may aid a user in setting up a game. One a player is on the origin, or in an origin area, then the player may be requested to begin gameplay or gameplay may autonomously begin.

Virtual interactive objects 585 may be provided in an actuality, or location-based game. Such virtual interactive objects may be activated when, for example, a virtual character's location on a virtual playfield nears, contacts, and/or resides in the virtual location of the virtual interactive object on the virtual playfield. Activating an object may cause, for example, the rules of the game to change (e.g., PACMAN can eat a ghost) or the characteristics of a player to change (e.g., the player obtains a particular weapon) for a period of time or until the game, or game-level, ends. In some embodiments, virtual objects may be PICKED UP by a virtual game character (e.g., by a user physically pressing an ACTION button on a controller such as an instruction glove or control buttons on a gaming device). Accordingly, a virtual object may then be PUT DOWN by a virtual game character.

Alternatively, both user's can have any actual origin (this allows for gameplay between two remote users). As described above, multiple embodiments may be provided that configure each user's gaming system, or the control signals provided to each user's gaming system, such that two remote users may play on the same virtual playfield. When playing of the same virtual playfield, the information sent to a user's gaming device of an opponents location may be utilized to generate a virtual character for that opponent on the user's gaming device. In this manner, a user may play an actuality game, or any location-based game, against his/her opponents.

Figure 6:
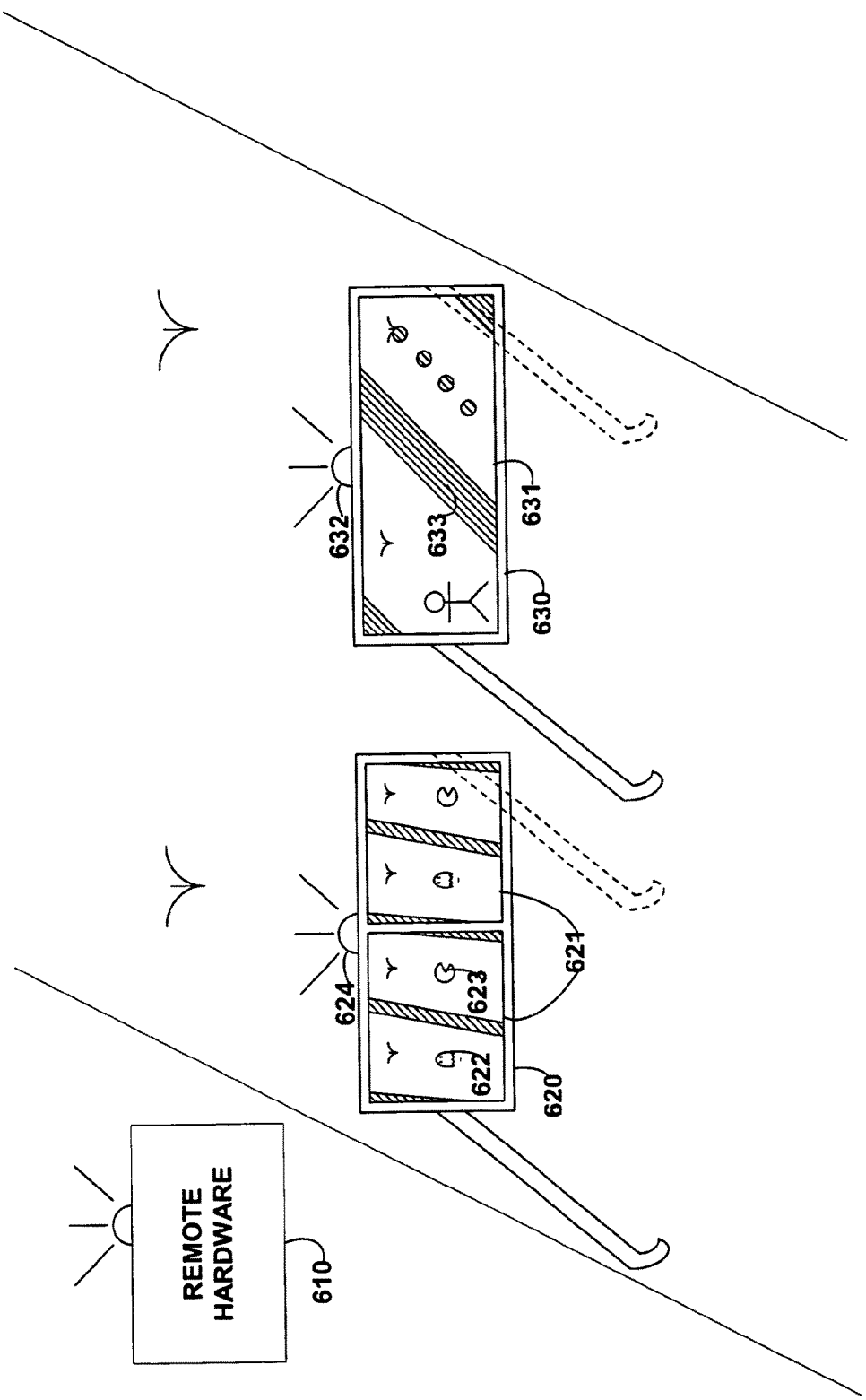
FIG. 6 is an illustration of one embodiment of a gaming system constructed in accordance with the principles of the present invention.

FIG. 6. shows environment 600 that includes gaming devices 620 and 630. Remote hardware 610 (e.g., a base station and/or remote processing circuitry) may also included to assist with single player or multiplayer gameplay.

Remote hardware 610 may be, for example, a remote memory (e.g., a remote database) that wirelessly communicates with one, or both, of devices 620 and 630. Remote hardware 610 may be positioned around the playfield and, for example emit a local location signal. Devices 620 and 630 may then determine a location based on one or more signals from remote hardware 610. Additional remote hardware 610 may be utilized so that devices 620 and 630 can more accurately obtain their physical positions. For example, three instances of remote hardware 610 may be provided around the playfield such that devices 620 and 630 and utilize the time it takes for these signals (e.g., the difference in time it took to transmit/receive each signal) to triangulate the location of devices 610 and/or 620.

Remote hardware 610 may include the functionality of a gaming base station such that the location of each of devices 620 and 630, or control signals indicative of the location of the devices on a playfield, is stored/retrieved by devices 620 and/or devices 630 on one or more instances of remote hardware 630. Persons skilled in the art will appreciate that remote hardware 610 is not necessary. Instead, devices 620 and 630 may communicate with each other and determine their relation to one another. This may be cost-efficient for simple multiplayer games such as, for example, the classic game of pong where the location devices represent paddles on the virtual video game playfield. In this manner, a "perimeterless" game of pong may be played such that a user may move 1,000 feet to the left to block an incoming pong-ball from passing while, the whole time, the other user moves 1,000 feet to follow the opponent player. Such a perimeterless game, or any location-based game, may provide great a large amount of exercise to a user.

Device 620 may include one or more displays 621. Such displays may be, for example, visible or semi-visible environment displays such that a user can see the environment around him/her. Images can then be selectively displayed on displays 621 and 622 such that a user can be displayed gaming indicia (e.g., virtual game characters, virtual interactive objects, and virtual impenetrable objects). Virtual game character 622 may be provided to device 620 to represent the character that the user of device 620 is controlling. In this manner, the location of a user on an physical playfield may not correlate exactly to the position of the virtual game character on the virtual game playfield. Instead, a "lagging" perspective may be provide such that the character controlled by a user appears at a distance in front of the user (e.g., 5 feet). In this manner, a user may be able to gain additional information about the video game (e.g., if another virtual character is chasing him/her). A control may be provided to switch the perspectives of the video game. For example, a control button may be provided to change such a "lagging" perspective to a first-person perspective.

Furthermore, because the location of device 630 is known, device 620 (or remote hardware 610) may provide an image of the virtual character of device as virtual character 623. Accordingly, virtual character 623 may be generated at the position where device 630 is located on the virtual playfield to represent the user of device 630. In this manner, if the user of device 630 picked PACMAN than virtual character 621 may be PACMAN. For displays that can provide images that completely block-out the environment in front of the user then he/she may not see the user of device 630 (if both users are playing on the same physical playfield) but the virtual character of the opponent. Generation of a user's virtual character, at the virtual character's location on a virtual playfield, on another user's display allows, for example, two users to play the same game on remote physical playfields.

Any instance of display 621 may be non-visible environment display such that a user is not able to see his/her world—only the virtual playfield. One benefit with a visible or a semi-visible environment device is that a user may move very quickly without the worry of tripping over the physical playfield (e.g., tripping over a rock). As a result, a user may be operable to use a visible, or semi-visible, environment device in more areas (e.g., a rocky field) than a non-visible environment configuration that is limited to a smooth surface (e.g., a basketball court).

Display 631 of device 630 shows a visor-type embodiment that does not overlay virtual characters over the positions of physical players on the same physical playfield. Display 631 of device 630 may display other virtual environment indicia 633 (e.g., interactive objects, impenetrable objects, and other virtual characters). Persons skilled in the art will appreciate that virtual environment indicia 633 may include software-controlled gaming characters (e.g., video game characters with artificial intelligence).

Circuitry 624 and 632 may include, for example, communications devices, processing circuitry, memory, speakers, additional locating devices, and locating receivers/transmitters. Additional locating data may be utilized. For example, the direction that a visor, or a gaming device with a game display, is pointing in may be determined by any number of location devices. For example, four location devices may be provided to determine not only the direction that visor 632 is pointing but also the pitch at which visor 632 is pointed in. Such information may be utilized to determine the user's perspective of the physical environment such that a corresponding perspective may be generated and subsequently displayed to the user. For example, four LPS devices may be provided. Two at the front of the visor at two different heights and two at the back of the visor at two different heights. If a user points his/her head down then the two LPS devices on both sides may record a difference in location and such a difference may be translated into a the pitch of the helmet. The direction that the visor is pointing in may be determined by the position of, for example, the average location of the front LPS devices and the average location of the rear LPS devices. Any methods of determining the pitch and/or direction that a device is pointing in may be utilized.

Persons skilled in the art will appreciate that a base station may be provided that determines images to be displayed to a user and transmits these images to a user at a rate (e.g., 32 frames per second). As a result, the weight of visor 630 may be decreased.

Figure 7:
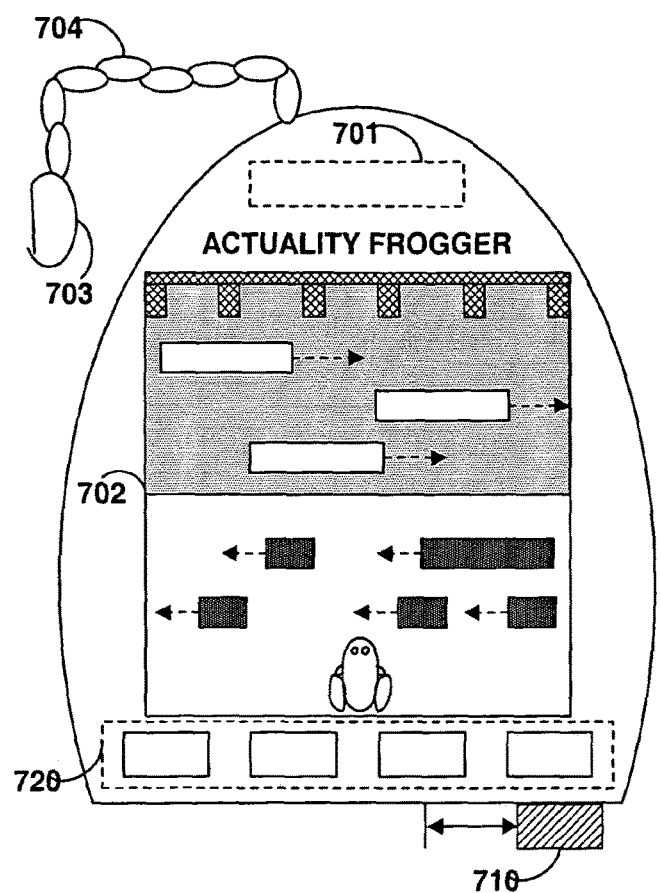
FIG. 7 is an illustration of one embodiment of a gaming system constructed in accordance with the principles of the present invention.

Turning now to FIG. 7, a compact and inexpensive actuality gaming system is provided as gaming system 700. Gaming system 700 of FIG. 7 may include no physical input devices other than optional ON/OFF switch 710. Alternatively, however, any number of buttons 720 may be provided (e.g., one or more FIRE WEAPON or ACTION buttons). If not additional input controls are provided then, for example, the size of display screen 702 may be maximized. Gaming system 700 may include chain 704 and clip 703 and may be small enough to fit inside a user's pocket. A user may interacts with game character 725 through his/her physical location. This location may be determined by any number, or types, of locating devices 701 (e.g., a GPS receiver or an accelerometer). Such a system may set an origin reference autonomously when the game is turned ON or right before the game starts. For example, a game may display that the game will start in a period of time (e.g., 3 seconds). Right before the game starts, an origin position may be read from locating device 701 and stored in a portion of memory that corresponds to an origin). Accordingly, the game may call a particularly, pre-defined portion of memory anytime that the origin is needed for gameplay.

As illustrated, the game of FROGGER is provided on display 702. In such an example, a user may turn ON his/her FROGGER Actuality game and the user's origin may be stored. For embodiments where the origin is stored, the user's location with respect to that position may, for example, be utilized to move FROGGER along a virtual playfield. For embodiments where the origin is not stored, the user's movement may, for example, be utilized to move FROGGER (e.g., an accelerometer may be used. Alternatively, a user's change in location may be utilized. Therefore, if a user's location (e.g., GPS location) changes by five feet than FROGGER's location change by 10 pixels.

Multiple types of impenetrable (or interactive) objects may be provided in a single game. For example, in FROGGER cars may be impenetrable objects that cause FROGGER to die (e.g., lose a life). Alternatively, the perimeter of the playfield may be an invisible impenetrable object such that when a user leaves a portion of the actual playfield that corresponds to a location of the virtual playfield outside of the perimeter, FROGGER is left behind at the perimeter. FROGGER can then be picked back up again by the user having his/her location correlate to FROGGER's location on the playfield. An additional icon may be provided when such a user goes out of bounds that shows the user where out of bounds the user is located. Such an additional icon may be beneficial to allow a user to more easily find the left-behind game character's position.

At the end of each level, for example, a new origin may be autonomously set, the user may be requested to return to the original origin (which may be shown on display 702 along with the user's current position), and/or the user may be prompted to select a new origin. In FROGGER, for example, the origin may be near the boundary of the virtual playfield. Accordingly, the user may be prompted to select a direction for gameplay. Such a direction may be determined by the device prompting the user to point the device in a particular direction (where the direction the device is pointed in may be displayed to the user) and recording this direction. The origin and/or the direction the user is pointing in may be utilized to calibrate system 700. Such directional information may also be utilized to calibrate an opponents gaming system, or signals sent to an opponents gaming system representative of a user's location on a virtual playfield.

Persons skilled in the art will appreciate that a gaming systems may take a long period of time (e.g., 30 seconds) to determine a user's location. This may be the result of, for example, a slow processor or a locating device that takes an amount of time to gather a location. A number of games may take advantage of this delay and to provide a unique actuality gaming experience. For example, suppose that a locating device takes 30 seconds to obtain location information. Display 702 may be a grid and a random box in the grid may highlight a particular period of time (e.g., 2 minutes). A count-down timer may be provided to display this, or a different period of time. For example, the count-down timer may display 2 minutes (time period minus time to determine a location). During the 90 seconds that the timer counts down, the user may be required to run to the next highlighted box. At the end of 90 seconds the user may be prompted to stop and take a 30 second break to catch his/her breath. During this time, a new location may be gathered and a new box on the grid highlighted. Such an example exhibits the functionality that even a simplistic device may provide. In this embodiment, an exercise device may be provided that increases a user's stamina by requesting that the user provide short bursts of movement. The selection of the next grid to be highlighted may result from an algorithm implemented to maximize the amount of calories that a particular user (e.g., a user having a particular weight) burns.

Figure 8:
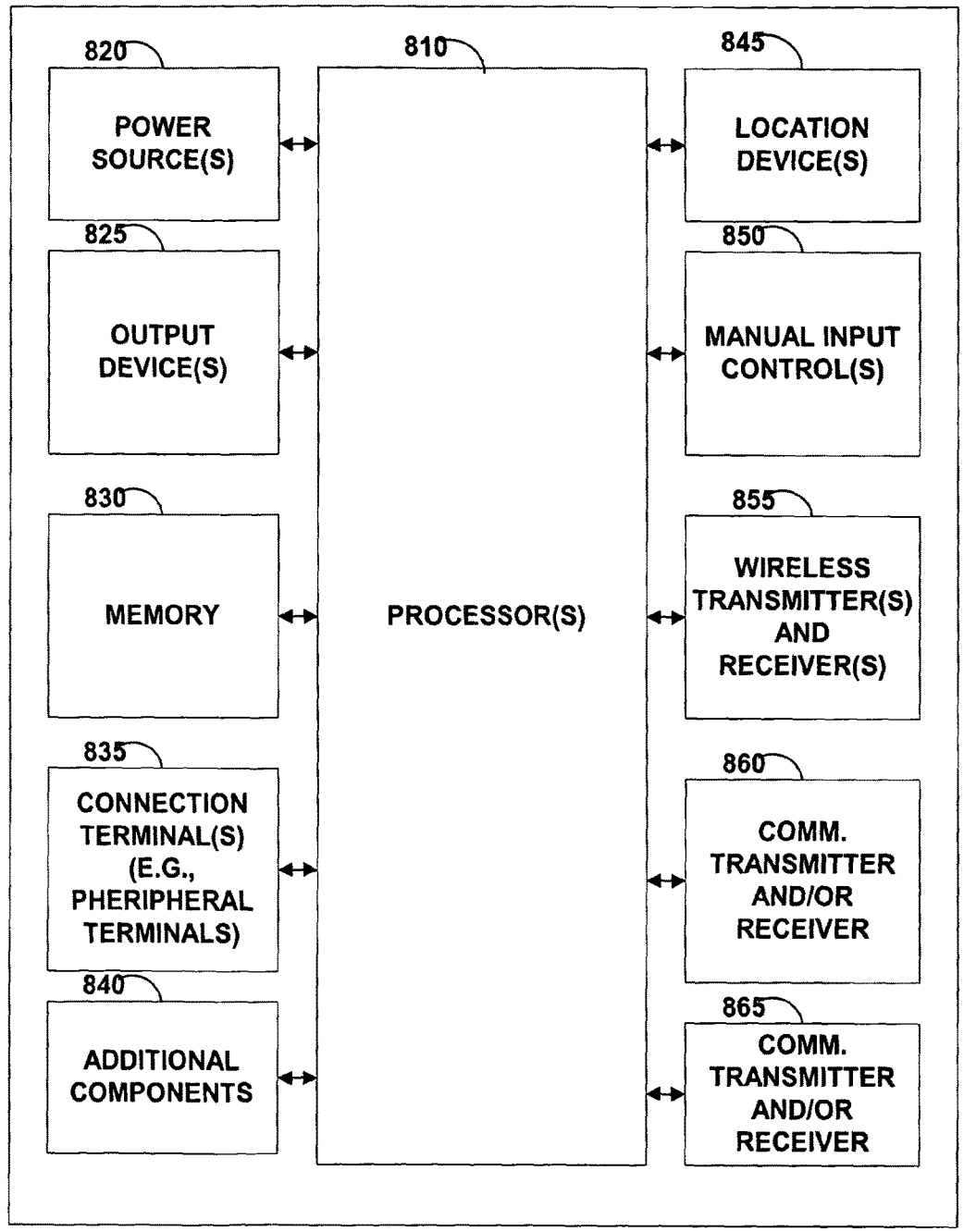
FIG. 8 is an illustration of a game system architecture constructed in accordance with the principles of the present invention.

FIG. 8 shows a number of components that may be included into gaming system 800. Persons skilled in the art will appreciate that components of gaming system 800 may also be utilized in, for example, a gaming base station. Gaming system 800 may include one or more power sources 820, output devices 825, memory devices 830, connection terminals 835, location devices 845, manual input controls 850, wireless transmitters/receivers 855, additional communication transmitters/receivers 860, and additional components 840.

Figure 9:
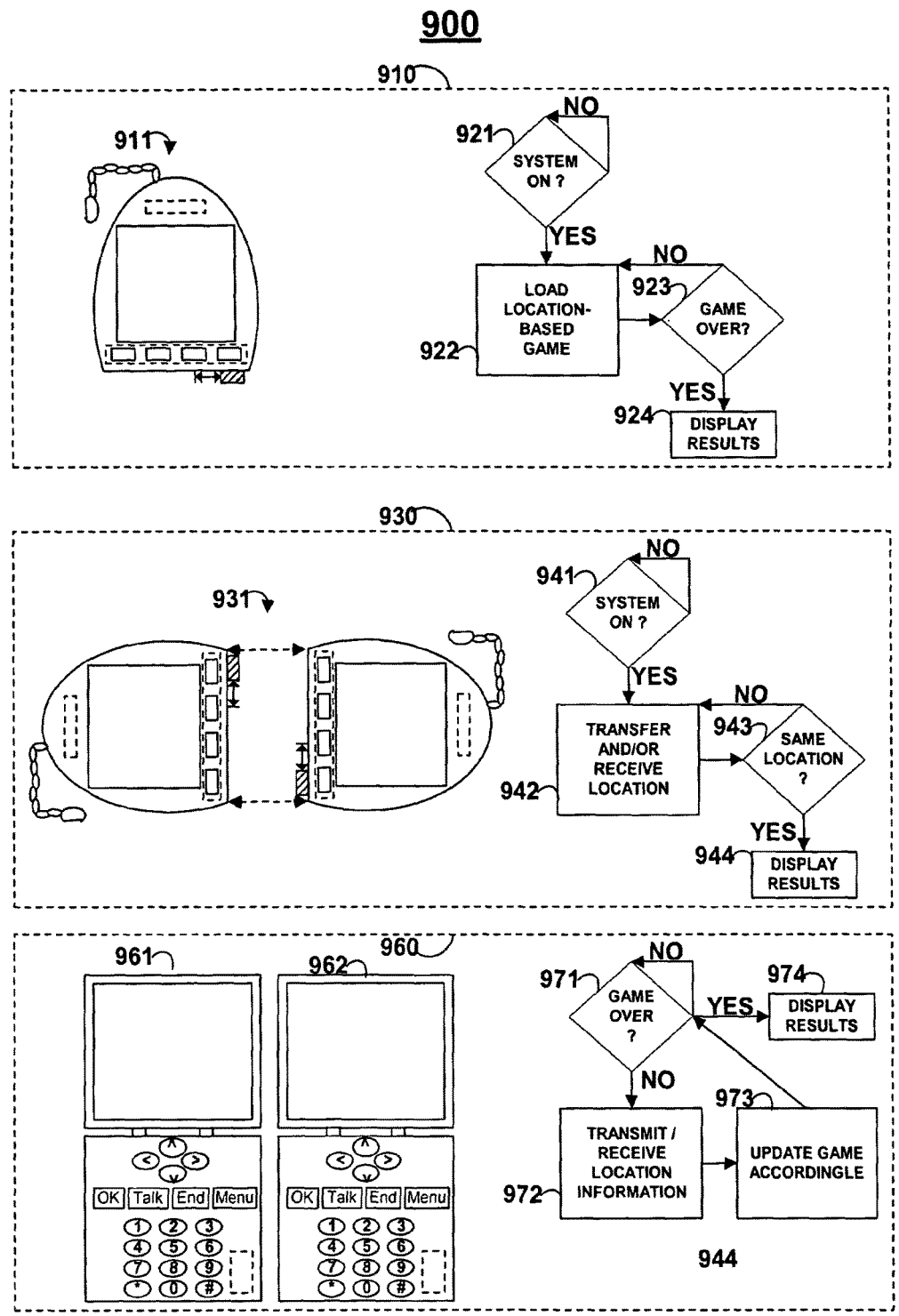
FIG. 9 are illustrations of multiple game system configurations constructed in accordance with the principles of the present invention.

FIG. 9 shows a few of the many types of location-based gaming systems operable to be constructed in accordance with the principles of the present invention. Particularly, FIG. 9 shows gaming systems 910, 930, and 960.

System 910 includes gaming system 911. Gaming system 911 may operate as follows. Step 921 waits until the system is turned ON. When the system is turned ON, a location-based game is initiated (e.g., step 922). The game continues playing until the game is over (determined by step 923). After the game is over, the results (e.g., a score, "GAME OVER," or "GAME WON" may displayed) be displayed in step 924.

System 930 includes gaming system 931 that is operable to be separated into two game systems. When the two game systems are connected together, a single game-system may be provided so that, for example, a larger display screen may be viewed by a user. When a two-player game is selected, the two gaming systems may be separated and information may be transmitted between the two gaming systems (e.g., location information or other opponent control signals).

Persons skilled in the art will appreciate that game cartridges may be utilized so that a system is operable to play any number of games. System 932 may, for example, include a single cartridge port, but may contain two separate memories (one for each of the two individual systems). Alternatively, the system may include one memory device in the system that does not include the game cartridge such that that system (or both systems) may have the entire game, or a portion of the game, written to memory. In this manner, one cartridge may be utilized to supply a game to both systems. In one embodiment, one system may run the game off the cartridge while the other system may run the game off a stored copy of the game that was written to memory on the other system before the two systems were separated. Each system may include, for example, their own power supplies and processors.

System 931 may operate as follows. When the system is turned ON at step 941, step 942 may initiate to receive location information (and other additional information) from an opponent and transmit location information (and other additional information) to an opponent. When the same location that is transmitted is received at step 943, step 944 may initiate and display the results of the game. Such a game may provide, for example, a global "tag your it" location-based game. The precision of the location may be chosen to change the way such a game is played. For example, the location may represent an area code. Therefore a "tag" occurs only when both players are in the same area code. The less amount of time it takes for a user to make a "tag" may associate to a higher score for that "tag."

System 960 includes two commercial devices 961 and 962 programmed to play a location-based game. System 960 may operate as follows. While a game in ON, location information is periodically transmitted and received by commercial devices 961 and 962. The games on commercial devices 961 and 962 may then be updated according to the received information. Game, or level, results may be displayed in step 974. Identical results, or customized results, may be displayed to both devices 961 or 962.

Persons skilled in the art will appreciate that received information is not limited to an opponents location information. For example, if an opponent performs an action (e.g, shoots a gun) that action may be transmitted, in some for, to the user's device such that the display of the user's device shows that action being performed by the opponent. In such a manner, a user's device may manipulate gameplay depending on, for example, an opponent's location and an opponent's actions.

Figure 10:
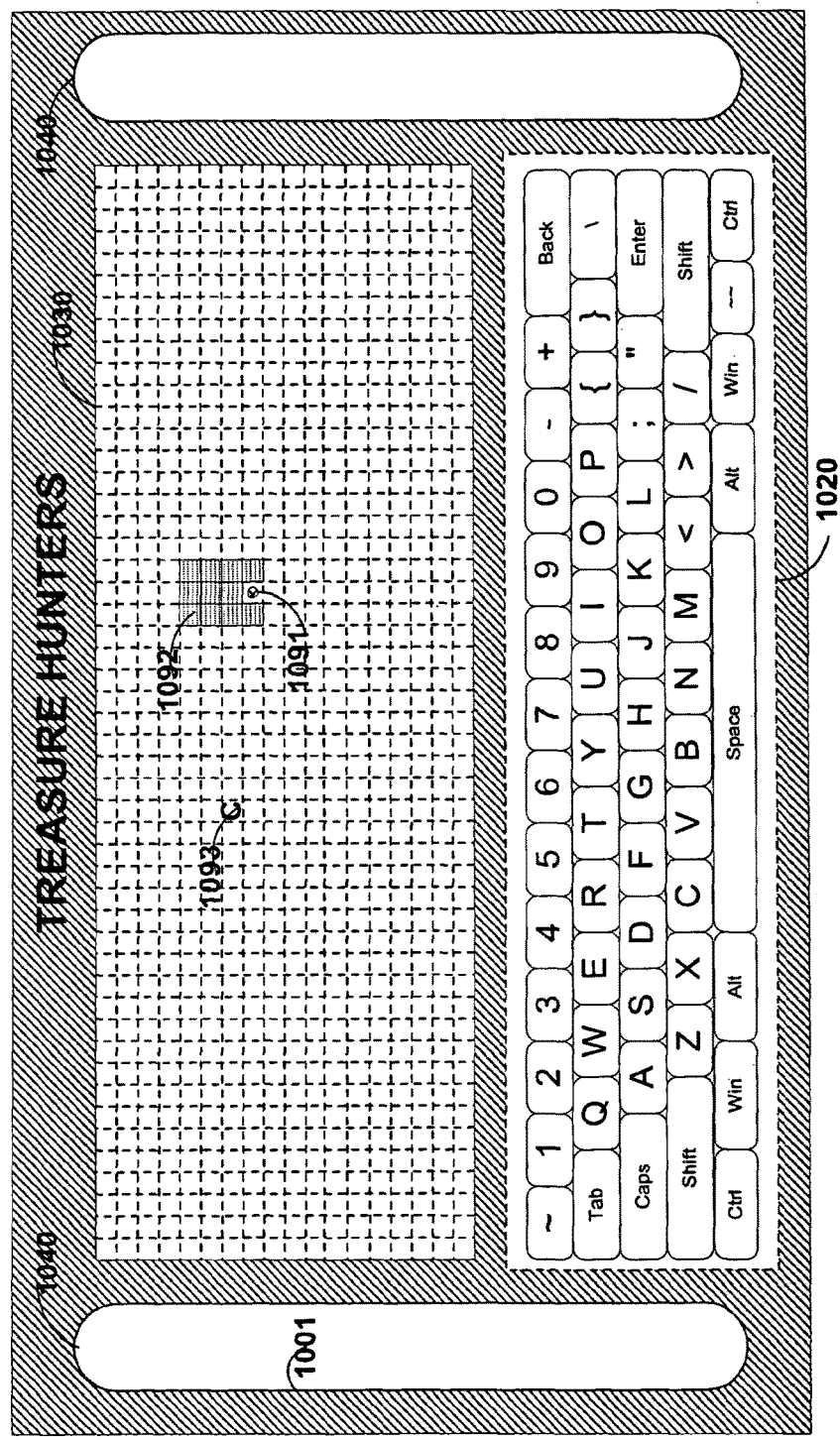
FIG. 10 is an illustration of a gaming system constructed in accordance with the principles of the present invention.

FIG. 10 shows one embodiment of location-based game 1000. Location based game 1000 may include housing 1001, display 1030, controls 1020 (e.g., a keyboard), and handles 1040.

A grid may be included, among other things, on display 1030 that is associated to different location areas that a user may travel in. Character 1091 may be included to represent the grid location on the virtual playfield that the user's actual location on a physical playfield corresponds too. One game functionality may hide unexplored areas of the grid (e.g., grid area 1092). Once the virtual character reaches such a grid area, however, grid 1092 may be uncovered to show what the grid contains (if anything). Past "findings" may be displayed. For example, clue 1093 may be uncovered and permanently displayed (or displayed until a game event occurs).

In one game embodiment, a user may have a fixed time to find a treasure on a playfield. Each block that the user uncovers (e.g., travels to), may require the user to win a mini-game. Such a mini-game may include, for example, defeating an enemy. In such an embodiment controls 1020 may be utilized to fight the enemy and display screen 1030 may, for the duration of the fight, replace the grid, or a portion of the grid, with a display screen showing an up-close perspective of the user's character and the enemy. The user may be given a time period to complete each mini-game. Other mini-games may be, for example, puzzles or other types of games. Such games may be location-based games in which movement of system 1000 moves the character in the mini-game. Some of the defeated enemies may not be removed from the game so that a return to the grid coordinate where the defeated enemy resides may result in a new fight with the enemy. Enemies (or other characters) may be inserted into grid coordinates at any time by the game and may move between such grid coordinates. In this manner, a location-based version of the classic game of Zelda may be realized. Since such a game may be larger than an actual playfield (e.g., a soccer field), an origin may be manually reset at any time where the origin may be representative of a mid-game starting position. For example, if a user reaches the end of his/her physical playfield at the position of the grid that character 1091 resides then the user may reset that location to the origin, turn around, and set that direction and the reference direction. Before this occurred, if the user walked backward, that user may have moved into a grid position down-from the location of character 1091. Now, the user may walk in that same direction, but may move forward into the grid location above character 1091.

Figure 11:
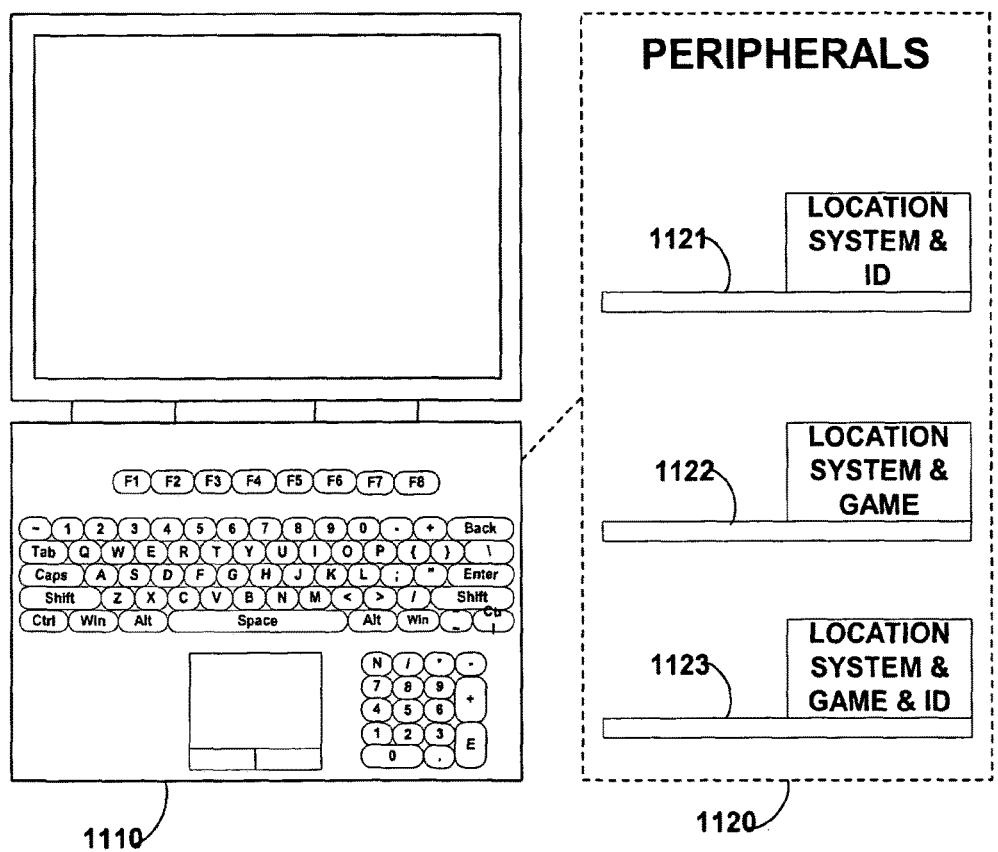
FIG. 11 are illustrations of gaming system peripherals constructed in accordance with the principles of the present invention.

FIG. 11 shows system 1100 in which non-location based game enabled device 1110 is enable to play location-based games with any one of peripherals 1121, 1122, and 1123. Peripheral may include a location system (e.g., a GPS device) and a unique ID that may be utilized for multiplayer use. Alternatively, just a locating device (e.g., a GPS device or an accelerometer) may be provided on peripheral 1121 and software may be utilized in device 1110 to provide an ID for that device (if needed to play a particular multiplayer game). Alternatively, peripheral 1122 may be utilized. Peripheral 1122 may include a location system and one or more particular location based games. Alternatively still, peripheral 1123 may be provided and may include one or more locating systems, one or more particular location-based games (e.g., actuality games), and a ID (or an ID for each game). Persons skilled in the art will appreciate that like the peripherals of system 1100, a game cartridge may also include a locating device (e.g., an accelerometer or GPS device) and/or an ID for multiplayer use.

FIG. 12 shows stationary device 1210 and network topology 1250. As mentioned above, stationary devices may also be utilized to control a virtual game character in a location-based game (e.g., an actuality game). As in one PACMAN embodiment, a stationary personal computer may be utilized to play a ghost on a virtual playfield against a person whose physical position on an physical playfield controls PACMAN on that same virtual playfield. The functionality that this, and other embodiments, of the present invention may provide may provide numerous benefits. For example, a father who is a soldier overseas fighting a war may go to a computer and play with his child who is at home playing an actuality game in a school playground. Such a father could also put on, for example, a visor-enabled actuality system or hold a portable visible environment gaming system (e.g., system 700 of FIG. 7) and go outside of a barracks and physically play a game with, and interact with, his child. As discussed above, such functionality may be obtained without sending a signal representative of either user's location (e.g., the distance and direction from a pre-defined origin may be transmitted, not the location itself).

Topology 1250 shows a gaming network. Such a gaming network may include any type of communications 1251 (e.g., wire-based or wireless communications). Any number of portable devices 1260 may be connected to the network. Portable devices 1260 may utilize the internet to provide information (e.g., portable devices 1260 may submit information through the internet or publish information to a webpage accessible by other components of topology 1250). Similarly, stationary devices 1270 may be included in and may transmit/receive information via the internet or other methods (e.g., wireless through a wireless telephone). One or more remote facilities 1280, or third-party content providers, may be coupled to any component of network topology 1250. Such facilities, or third-party content providers, may, for example, store gameplay information (e.g., a players location information or action information). Such facilities, or third-party content providers, may, for example, provide games for portable devices 1260 and stationary devices 1270 to download.

Figure 13:
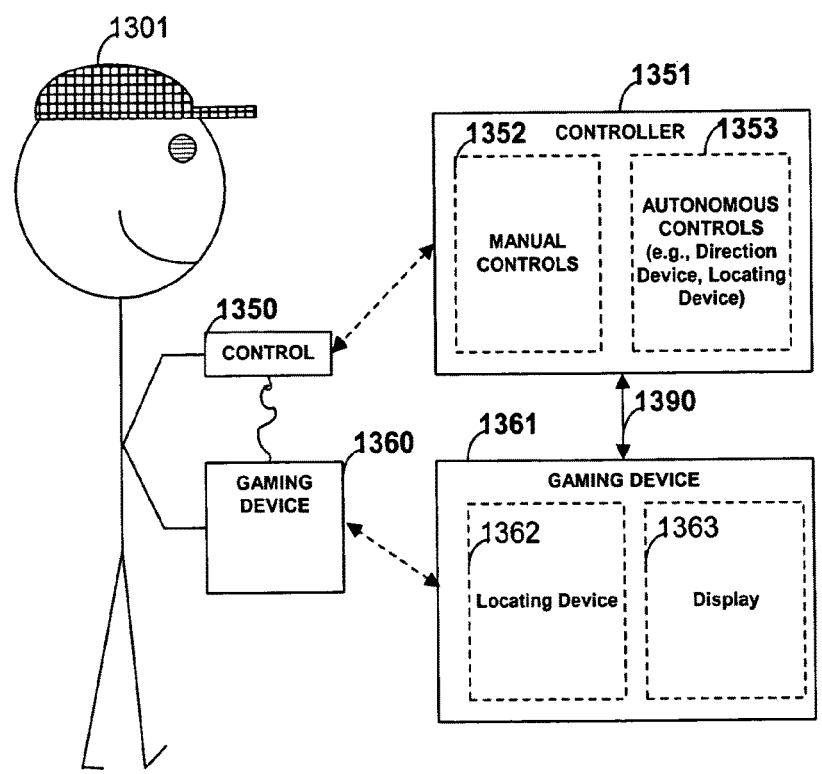
FIG. 13 is an illustration of a gaming system constructed in accordance with the principles of the present invention.

Turning now to FIG. 13, system 1300 is shown that includes user 1301 using gaming device 1360 and controller 1350. Gaming device 1360 and controller 1350 may communicate to each other, and other devices, either wirelessly or through a wire-based connection. Controller 1351 and Gaming device 1390 may include any components included in, for example, system 800 of FIG. 8.

For example, controller 1351 may include manual controls 1352 and anonymous controls 1353. Manual controls 1352 may take the form of manual buttons, such as a trigger. As such, controller 1351 may take the form of a gun. Autonomous controls 1353 may include a directional device that determines the direction that the gun is pointed in and/or the pitch that the gun is pointed in. Autonomous controls 1352 may also include any number of locating devices such that the location of controller 1351 may be determined. Accordingly, the location of controller 1351 may be determined on a pre-defined, or user-defined, playfield or in the world. Controller 1351 may take any shape. For example, controller 1351 may take the shape of a steering wheel, baseball bat, golf-club, sword, glove, or any other shape a user can interact with.

Physical interactive objects may also be included with any of the components of controller 1351 that multiple users may physically interact with. Such physical interactive objects may include, for example, a soccer ball, baseball, football. A user's sword may also be an interactive object because an opponents sword may physically interact with that user's sword. Such interaction may provide additional controls signals to a game. For example, the swords may have touch sensors to determine when they are in contact with one another (or if something is in contact with the sword).

Gaming device 1390 may include a display in which, for example, the virtual playfield and virtual objects (e.g., virtual characters, impenetrable objects, and interactive objects) may be displayed. Gaming device 1390 may also include any number of location devices 1362. In this manner, a user may walk through a virtual playfield by using gaming device 1360 and interact with the environment using controller 1351. Accordingly, gaming device 1360 may be, for example, a visor-based device.

Persons skilled in the art will appreciate that manual buttons may be provided as manual controls on a gaming device or a controller. For example, a SPEED BOOST button may be provided that may propel a user a particular distance forward through a virtual playfield. Alternatively, such a SPEED BOOST button may change the scaling of the player's physical movement to the virtual character's movement such that the speed of the virtual character is increased. Such a SPEED BOOST may last for a period of time or as long as the SPEED BOOST button is pressed. If the SPEED BOOST is used to display a user's location then a new origin may, for example, be determined such that a user's movement on the physical playfield does not cause the virtual character to return to the location on the virtual playfield that virtual character was before the SPEED BOOST was initiated. In this manner, an origin may periodically, or manually, be updated. Generally, an origin is a location reference that the gaming system utilizes to map a virtual playfield to a physical playfield.

Generally, a game is goal-oriented in nature. The goal may be, for example, to kill a particular character, solve a puzzle, reach a particular destination, or perform a particular action. Generally, such goals are not able to be obtained on a particular physical playfield, but, for example, with video game control signals provided by a user's interaction with that physical playfield.

Figure 14:
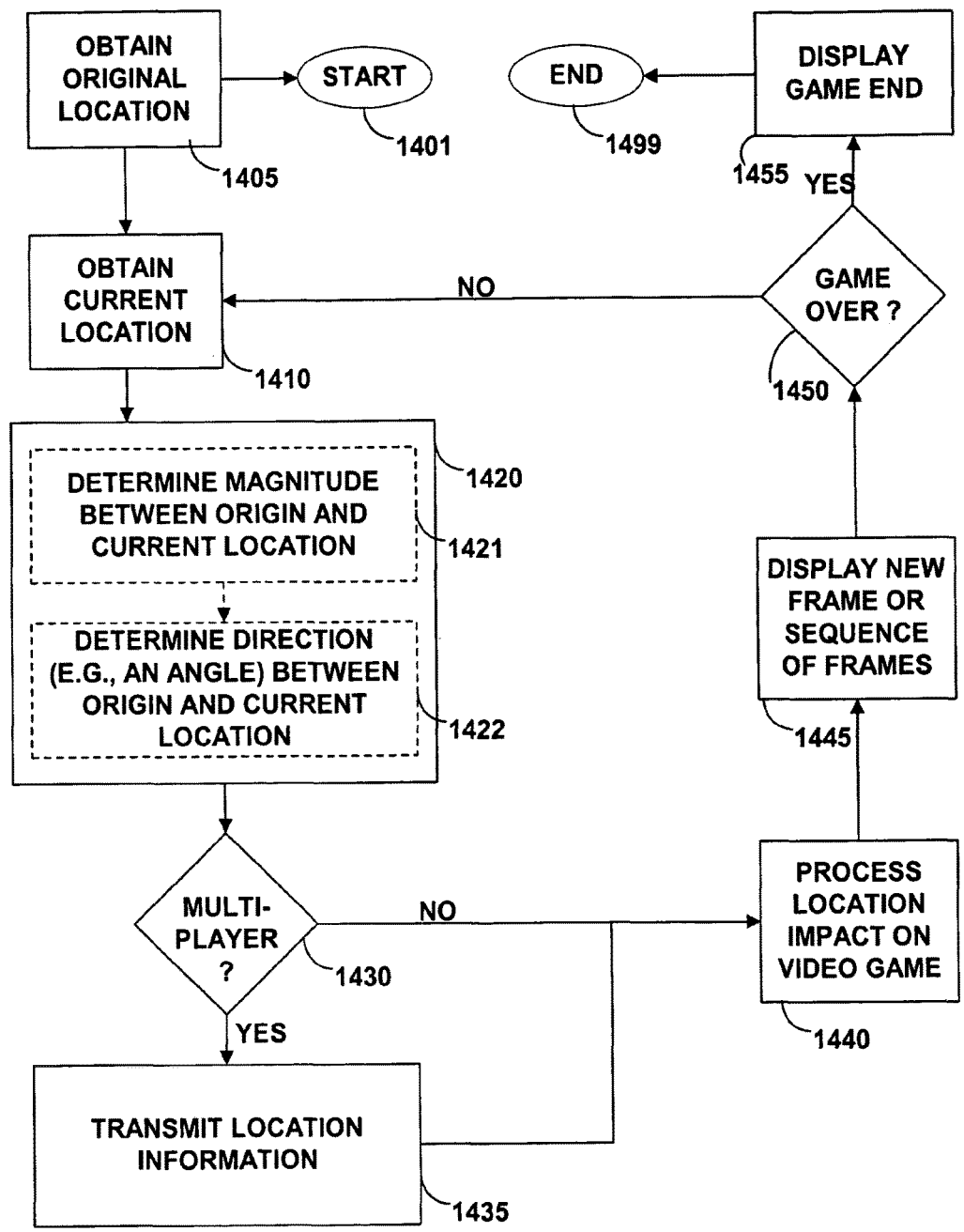
FIG. 14 is an illustration of a flow chart of a multiplayer game that shares location information constructed in accordance with the principles of the present invention.

Looking at FIG. 14, flow chart 1400 is provided that illustrates one embodiment of a multiplayer game where location information may be scaled and shared to multiple users. Flow chart 1440 may start at step 1401 and continue to step 1405 where a first location (e.g., an origin location) is determined.

Such a location may be determined by retrieving a location reading from a location device or accessing a portion of memory dedicated to storing the most recently determined location by a location device. In this manner a location device may be provided that writes to this dedicated portion of memory every time a new location is determined. Such a dedicated memory may include space to store more than just one location (or information representative of one location). For example, a dedicated memory may store any number of locations (e.g., the last 100 locations). When writing a new location to memory, that location information may overwrite the oldest location stored in such memory. Alternatively, an different user's origin may be obtained in step 1405 by receiving location information from a different user.

After step 1405 occurs, step 1410 may occur. In step 1410 the next, or a current, location may be utilized (e.g., by a processor). Alternatively, this origin location (and/or information about a user's playfield perimeter) may be transmitted to a different user after step 1405 occurs. Persons skilled in the art will appreciate that numerous steps may be included at any portion of flow chart 1400. For example, once an original location is obtained, a virtual game character may be displayed on a virtual playfield at the origin of that virtual playfield (e.g., PACMAN or FROGGER's origin position).

Step 1420 may occur after step 1410. As shown above in multiple embodiments multiple ways of scaling a location control input may be utilized. Scaling a location control input may similarly be utilized in many ways. For example, scaling an input may cause a virtual game character to move at a different speed while a particular scaling is being used. Alternatively, multiple devices may have control information that is scaled so that each user may play the same game from remote locations (e.g., "location-synching" two devices) yet even location synching here is optional. For example, no "location-synching" may be included in a game system where no origin is needed at the start of the game, a playfield does not have a perimeter, and only the distance/magnitude moved between two locations is used as a control signal).

As shown, step 1420 may determine the magnitude between the origin location and the current location in step 1421. Additionally, step 1420 may determine the direction, or angle, between the origin location and the current location in step 1422. Such angle and magnitude information may be stored, for example, as a vector. To determine the angle of the new location, for example, an angle reference vector may be generated based on the origin location and utilized to determine angle offset of new locations based on this angle reference vector. Persons skilled in the art will appreciate that a location reading may take many forms. In some embodiments, a location reading may be a latitude and longitude (either on the world or on a local playfield). In other embodiments, a location reading may be a direction and/or magnitude change or a movement vector. In even other embodiments, a location reading may be a rate of acceleration.

To illustrate yet another scaling embodiment, suppose step 1420 determines a direction and magnitude change. If in a multiplayer mode (e.g., step 1430) then this information may be transmitted to an opponents gaming system in step 1435. The opponent's gaming system may have past transmitted location information and may utilize the current transmitted information to determine where the user's virtual character has moved to on the virtual playfield. If the user and the opponent are on physical playfields of different sizes, then the control information may have to be scaled. Such scaling may occur before the information is transmitted such that the opponents system may not have to have knowledge of the user's physical playfield. The transmitted information may be scaled (e.g., in step 1422) to a default playfield size (e.g., the system scales to a 100 ft.×100 ft default playfield size). Similarly, the opponents device may scale its own location information to this third, default playfield size (e.g., the system scales to a 100 ft.×100 ft default playfield size). Suppose the user of process 1400 is on a 10 ft.×10 ft. defined physical playfield. Step 1400 may, for example, multiple each magnitude by 10 such that a location that is on the 10 ft. physical perimeter is associated to the default 100 ft. perimeter. Such 100 ft. information may then be transmitted to an opponent and used directly by that opponents system without the need to scale. Suppose the opponent's physical playfield is 200 ft.×200 ft. Then the opponent's location data may be scaled, for example, by 0.5 and transmitted to the user of process 1400 such that process 1400 does not have to scale incoming data (instead process 1400 may assume data is already scaled). Alternatively, process 1400 may scale incoming data (and may be provided information as to how the incoming data should be scaled). Alternatively, location information may be transmitted and utilized as a percentage to the perimeter and the angle from the origin (such that the perimeter information may not be transmitted). Alternatively, location information may be scaled to, for example, a particular user's playfield (and such information may be shared by the devices). In this manner, two physical playfields may be normalized onto one virtual playfield (even though each system may technically have its own generated virtual playfield).

Step 1400 may process the impact of location information on the video game. Particularly, one or more locations may be translated into control signals to the video game and the outcome of such control signals may be determined and utilized to display an updated game to a user. Step 1445 may display a new frame or a sequence of frames to a display to update a game. For example, if an opponent's game system takes an amount of time for location information to be obtained (e.g., 5 seconds), step 1445 may display a sequence of frames, over a period of time, such that the opponent's virtual character's location does not appear to dramatically skip between locations. As per another example, if a particular user performs a particular action, a pre-stored animation may play. Such an animation may be displayed as a sequence of frames in step 1445.

Step 1450 may determine if the games over. In this manner, step 1450 may occur after step 1440. If the game is not over, step 1410 may be repeated. Else, step 1455 may be initiated such that a game ending program is executed (e.g., the game is restarted) or a GAME OVER screen is displayed. After step 1445, the process may end at step 1499.

Systems and methods for delivering content to a wireless telephone are also provided. For example, data interchange between wireless telephones and the internet, or an intranet, using a minimal number of steps for at least first time users is provided.

Confirmation that a user is in possession of a wireless telephone may be provided, for example, by having the user respond to a text message from the wireless telephone. Multiple types of content may be downloaded to a user either by themselves or in groups with a single download or email. Multiple links may be included, for example, in a text message to a wireless telephone such that multiple types of content may be downloaded with a single message.

If the content (e.g., the location-based game) is free-of-charge then a payment confirmation step my be removed from a download process. Types of content may include, for example, phone numbers, applications, location-based games, ringers, and pictures.

A data interchange is provided. Users may upload content from a wireless telephone and allow different people, or a select set of people (e.g., people that the user has given permission to), to download content to the downloading user's wireless devices (e.g., a wireless Personal Electronic Device). For example, phone numbers may be uploaded and stored on a webpage for a particular user. Thus, a user has a backup of his or her wireless telephone numbers that can then be downloaded to a different wireless telephone. As per another example, the location of a user may be uploaded to a remote server and accessed by people that the user has given permission to.

Interactive games are provided to wireless telephones by, for example, including a database that can store the game's progress. As in one embodiment, to provide a simple wireless chess game, a user may upload his "next" move onto a remote database. In this manner, a second user may then download this "next" move from the remote database either himself, automatically, or the user may be prompted to do so. In this manner, a user's location may be uploaded to a user database and downloaded to a subsequent user database.

An automatic update may be provided to a wireless telephone user. In this manner, a user may sign up for a particular service (e.g., daily wallpaper) and, every morning, that user may be provided a different background (e.g., a January 15$^{th}$ Calendar page exhibiting a comic personality) every day or period of time. This feature may be extended to games such that, every morning, a new game level, or a new game, is sent to a user.

A wireless telephone is provided that is operable to have non-service provider automatic updates without the consent of the wireless telephones user every time data is downloaded. For example, a program may be provided to the wireless telephone that allows a user to accept and begin downloading any type of content from a particular entity. This program utilizes the "content provider" descriptor to determine if the content is allowable for download. Thus, a user only has to approve content from the "content provider" once and then all subsequent downloads from that content provider are automatically approved by the program. In order to protect from people falsifying the "content provider field," a wireless telephone may be configured to send a "file receipt message" to a source location (e.g., a wireless telephone may be configured to receive a "source location" description field). If the acknowledgement does not match a shipment by the source location then the wireless telephone may be notified of a falsified transmission and the downloaded material deleted. A service provider (e.g., Sprint PCS) may keep a list of all content origins and may serve as an intermediary to confirm that the file was sent by the third-party content provider acknowledged in the "source location" field.

A wireless telephone is also provided that is operable to download a file directly without a .GCD, or similar, file. This wireless telephone preferably contains a large amount of memory (e.g., 128 MB or 1 GB) such that the download of a file of an unrecognizable file type does not result in a user having to delete already downloaded content in order to make room for the new file. The wireless telephone can be configured to provide a message to a user if the downloaded file is of an unrecognizable type. The wireless telephone can also connect to a remote database to obtain a list of file types and associated programs and, if a program is associated to a file type, automatically download the program to run the previously unrecognized file type.

Person skilled in the art will appreciate that when playing in a multiplayer mode, or playing a location-based game, other functions of a device may be utilized. For example, a user may be provided the ability to talk to an opponent through that user's gaming system while that user is playing a multiplayer actuality game against the opponent. Such a capability may be provided, for example, by forming a wireless communications message by interspersing frames of data with frames of audio.

From the foregoing description, persons skilled in the art will recognize that this invention generally relates to providing a control signal to a game that is representative of the physical location of a person in an actual environment and for improving data sharing and exchange in wireless devices such as wireless telephones. Persons skilled in the art will appreciate that the various configurations described herein may be combined without departing from the present invention. It will also be recognized that the invention may take many forms other than those disclosed in this specification. Accordingly, it is emphasized that the invention is not limited to the disclosed assemblies and methods, but is intended to include variations to and modifications therefrom which are within the spirit of the following claims.

What is claimed is:

1. A system comprising:
  a wireless telephone having a locating device and a display, wherein a location-based video game is operable to be played on said wireless telephone, first location-based control signals are operable to be utilized, at least in part, to control a location-based video game character in said location-based video game, a manual control is operable to cause said location-based video game character to perform an action, said location-based video game character is operable to be displayed on said display, a second video game character that is operable to be controlled via artificial intelligence, and is not controlled by manual-input, is operable to be displayed on said display, and said first location-based control signals are provided by said locating device, wherein said locating device includes an accelerometer.

2. The system of claim 1, wherein further comprising a second locating device that includes a positioning device.

3. The system of claim 1, further comprising a directional device for determining direction.

4. A system comprising:
  a first wireless telephone having a first locating device, wherein a location-based video game is played on said first wireless telephone, first location-based control signals are utilized to control a first location-based video game character in said location-based video game, a manual control that is operable to cause said first location-based video game character to perform an action, and said first location-based control signals are provided by said first locating device, wherein said first locating device includes an accelerometer; and
  a second wireless telephone having a second locating device and a display, wherein second location-based control signals are utilized to control a second location-based video game character in said location-based video game, said first location-based video game character and said second location-based video game character is displayed on said display, said second location-based control signals are provided by said second locating device, and a third game character displayed on said display that is controlled via artificial intelligence and is not controlled by manual-input.

5. The system of claim 4, further comprising a second locating device that includes a positioning device.

6. The system of claim 4, further comprising a directional device for determining direction.

7. The system of claim 4, further comprising a fourth video game character, wherein said fourth video game character is controlled via artificial intelligence.

8. The system of claim 4, wherein said first location-based video game character is selected from a list of characters.

9. The system of claim 4, wherein said first wireless telephone includes a second manual input control.

10. The system of claim 4, wherein said location-based video game is selected from a list of location-based video games.

11. The system of claim 1, further comprising a third video game character.

12. The system of claim 1, wherein said location-based video game character is selected from a list of characters.

13. The system of claim 1, wherein said wireless telephone includes a second manual input control.

14. The system of claim 1, wherein said location-based video game is selected from a list of location-based video games.

15. The system of claim 1, wherein said wireless telephone includes a plurality of manual input controls.

16. The system of claim 4, wherein said first wireless telephone includes a plurality of manual input controls.

* * * * *